(12) United States Patent
Sasaki

(10) Patent No.: US 9,711,904 B2
(45) Date of Patent: Jul. 18, 2017

(54) CONNECTOR AND CONNECTOR ASSEMBLY

(71) Applicant: JAPAN AVIATION ELECTRONICS INDUSTRY, LIMITED, Shibuya-ku, Tokyo (JP)

(72) Inventor: Takuo Sasaki, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 15/202,290

(22) Filed: Jul. 5, 2016

(65) Prior Publication Data

US 2017/0062986 A1    Mar. 2, 2017

(30) Foreign Application Priority Data

Sep. 2, 2015    (JP) ................................. 2015-173221

(51) Int. Cl.
*H01R 13/641* (2006.01)
*H01R 13/627* (2006.01)
(Continued)

(52) U.S. Cl.
CPC ........ *H01R 13/641* (2013.01); *B60L 11/1818* (2013.01); *H01R 13/6275* (2013.01); *H01R 13/639* (2013.01); *H01R 2201/26* (2013.01)

(58) Field of Classification Search
CPC ................................................ H01R 43/0428
See application file for complete search history.

(56) References Cited

U.S. PATENT DOCUMENTS 5,065,282 A * 11/1991 Polonio ................... H01L 24/32
174/547
5,413,493 A *  5/1995 Hoffman .............. H01R 13/629
200/51.09

(Continued)

FOREIGN PATENT DOCUMENTS

CN        102005680 A    4/2011
EP       2863488 A1    4/2015
(Continued)

OTHER PUBLICATIONS

Extended European Search Report (EESR) dated Dec. 15, 2016, issued in counterpart European Application No. 16180744.1.

*Primary Examiner* — Truc Nguyen
(74) *Attorney, Agent, or Firm* — Holtz, Holtz & Volek PC

(57) ABSTRACT

A connector is mateable with a mating connector along a predetermined direction. The connector comprises a mated-state detection member and a holding mechanism which includes a reference surface, insulating portions and an insulating external wall. Each of the insulating portions projects from the reference surface by a first predetermined length in the predetermined direction. The insulating external wall projects beyond the reference surface in the predetermined direction and surrounds the insulating portions in a plane perpendicular to the predetermined direction. The mated-state detection member is held by the holding mechanism and is movable between a projecting position and a receding position in the predetermined direction. The mated-state detection member at the projecting position projects from the reference surface by a second predetermined length which is shorter than the first predetermined length. The mated-state detection member is moved to the receding position by the mating connector mated with the connector.

11 Claims, 17 Drawing Sheets

(51) Int. Cl.
*B60L 11/18* (2006.01)
*H01R 13/639* (2006.01)

(56) References Cited

U.S. PATENT DOCUMENTS

| | | | | |
|---|---|---|---|---|
| 5,676,560 A * | 10/1997 | Endo | B60L 11/1818 | 439/310 |
| 5,803,760 A * | 9/1998 | Ito | B60L 11/1818 | 439/310 |
| 5,984,706 A * | 11/1999 | Kakuta | B60L 11/1818 | 439/310 |
| 6,053,756 A * | 4/2000 | Flanigan | H01R 13/641 | 439/315 |
| 6,341,973 B1 * | 1/2002 | Endo | H01R 13/641 | 439/350 |
| 7,404,720 B1 * | 7/2008 | Frey | H01R 13/701 | 439/133 |
| 9,048,567 B2 | 6/2015 | Takagi et al. | | |
| 9,088,096 B2 | 7/2015 | Toratani et al. | | |
| 9,088,101 B2 | 7/2015 | Toratani et al. | | |
| 9,225,109 B2 | 12/2015 | Sasaki et al. | | |
| 2011/0300733 A1 * | 12/2011 | Janarthanam | B60L 11/1818 | 439/304 |
| 2013/0040486 A1 * | 2/2013 | Kurumizawa | H01R 13/639 | 439/350 |
| 2013/0102163 A1 * | 4/2013 | Basavarajappa | B60K 15/05 | 439/34 |
| 2014/0273608 A1 * | 9/2014 | Whetstone | H01R 13/625 | 439/488 |
| 2014/0287614 A1 * | 9/2014 | Nakajima | B60L 11/1818 | 439/489 |
| 2015/0011111 A1 * | 1/2015 | Toratani | H01R 13/6683 | 439/357 |
| 2015/0111408 A1 * | 4/2015 | Sasaki | H01R 13/627 | 439/357 |
| 2015/0374370 A1 * | 12/2015 | Zergiebel | A61B 17/068 | 439/21 |
| 2016/0013587 A1 * | 1/2016 | Shimizu | H01R 13/5227 | 439/153 |
| 2016/0197430 A1 | 7/2016 | Fujita et al. | | |

FOREIGN PATENT DOCUMENTS

| | | |
|---|---|---|
| JP | 04133375 U | 12/1992 |
| JP | 05328619 A | 12/1993 |
| JP | 09120866 A | 5/1997 |
| JP | 2009252656 A | 10/2009 |
| JP | 2012064505 A | 3/2012 |
| JP | 5080662 B2 | 11/2012 |
| JP | 2013093149 A | 5/2013 |
| JP | 2013206873 A | 10/2013 |
| JP | 2014102940 A | 6/2014 |
| JP | 2014150012 A | 8/2014 |
| JP | 2014182912 A | 9/2014 |
| JP | 2015072851 A | 4/2015 |
| JP | 2015079679 A | 4/2015 |
| WO | 2015060294 A1 | 4/2015 |

* cited by examiner

C1 : LOCK POSITION UNDER MAINTENANCE STATE
C2 : UNLOCK POSITION UNDER MAINTENANCE STATE
C3 : LOCK POSITION UNDER PERMISSION STATE
C4 : UNLOCK POSITION UNDER PERMISSION STATE

CONNECTOR AND CONNECTOR ASSEMBLY

CROSS REFERENCE TO RELATED APPLICATIONS

This application is based on and claims priority under 35 U.S.C. §119 to Japanese Patent Application No. JP2015-173221 filed Sep. 2, 2015, the contents of which are incorporated herein in their entirety by reference.

BACKGROUND OF THE INVENTION

The present invention relates to a connector which is mated with a mating connector upon transmission or reception of electric power. In addition, the present invention relates to a connector assembly comprising the connector and the mating connector. For example, the mating connector is an inlet provided in an electric vehicle (EV), and the connector is a plug.

For example, this type of connector is disclosed in JP A 2013-93149 (Patent Document 1), the contents of which are incorporated herein by reference.

Referring to FIGS. 32 and 33, Patent Document 1 discloses a connector 900 comprising a connector body 910, a case 920, a holding member 930, a lock member 940 and a slider 950. The case 920 accommodates the connector body 910 so that the connector body 910 is movable along a predetermined direction indicated by an arrow. The holding member 930 holds the case 920 so that the case 920 is movable along the predetermined direction. The lock member 940 locks the case 920 to prevent a movement of the case 920 relative to the holding member 930. The slider 950 projects outward from the case 920 under an unmated state where the connector 900 is not mated with a mating connector (not shown). When the connector 900 is mated with the mating connector, the mating connector pushes and moves the slider 950 into the case 920. The thus-moved slider 950 moves the lock member 940 to unlock the case 920, so that the case 920 can be moved relative to the holding member 930. As can be seen from the above description, the slider 950 is used for detection of the mated state.

The slider 950 of the connector 900 disclosed in Patent Document 1 can be pushed to be moved even under the unmated state where the connector 900 is not mated with the mating connector. If the slider 950 is unintentionally pushed under the unmated state, the mated state might be incorrectly detected.

SUMMARY OF THE INVENTION

It is therefore an object of the present invention to provide a connector having a structure which is useful for prevention of incorrect detection of a mated state. In addition, it is an object of the present invention to provide a connector assembly comprising such connector.

An aspect of the present invention provides a connector mateable with a mating connector along a predetermined direction. The connector comprises two power terminals, at least one signal terminal, a mated-state detection member and a holding mechanism. The holding mechanism comprises a reference surface, a plurality of insulating portions and an insulating external wall. The insulating portions include two insulating portions for the power terminals, and at least one insulating portion for the signal terminal. Each of the insulating portions projects from the reference surface by a first predetermined length in the predetermined direction. The insulating external wall projects beyond the reference surface in the predetermined direction and surrounds the insulating portions in a plane perpendicular to the predetermined direction. Each of the power terminals is held by the holding mechanism and extends along the predetermined direction. The power terminals have ends, respectively, and the ends of the power terminals are accommodated in the insulating portions for the power terminals, respectively. The at least one signal terminal is held by the holding mechanism and extends along the predetermined direction. The at least one signal terminal has an end which is accommodated in the at least one insulating portion for the signal terminal. The mated-state detection member is held by the holding mechanism and is movable between a projecting position and a receding position in the predetermined direction. When the mated-state detection member is positioned at the projecting position, the mated-state detection member projects from the reference surface by a second predetermined length which is shorter than the first predetermined length. When the connector is mated with the mating connector, the mated-state detection member is pushed by the mating connector and is moved to the receding position.

Another aspect of the present invention provides a connector assembly comprising the connector and a mating connector mateable with the connector along a predetermined direction. The mating connector comprises two mating power terminals, at least one mating signal terminal and a mating holding mechanism. The mating power terminals correspond to the power terminals, respectively. The at least one mating signal terminal corresponds to the at least one signal terminal. The mating holding mechanism comprises a mating reference surface and a mating push portion. The insulating portions have ends, respectively, in the predetermined direction. When the connector is mated with the mating connector, the ends of the insulating portions face the mating reference surface. The mating push portion is apart from the mating reference surface by a third predetermined length in the predetermined direction. The third predetermined length is equal to or shorter than the first predetermined length. When the connector is mated with the mating connector, the mating push portion pushes the mated-state detection member and moves the mated-state detection member to the receding position.

According to an aspect of the present invention, the insulating external wall surrounds a three-dimensional space in which the at least three insulating portions extend in parallel to one another. The mated-state detection member projects in the three-dimensional space by the second predetermined length when being positioned at the projecting position. The second predetermined length, or the projecting length of the mated-state detection member positioned at the projecting position, is shorter than the first predetermined length, or the length of the insulating portion. The thus-arranged insulating external wall and insulating portions prevent the mated-state detection member from being unintentionally brought into contact with any members or portions, and therefore, are useful for prevention of incorrect detection of the mated state.

An appreciation of the objectives of the present invention and a more complete understanding of its structure may be had by studying the following description of the preferred embodiment and by referring to the accompanying drawings.

Figure 1:
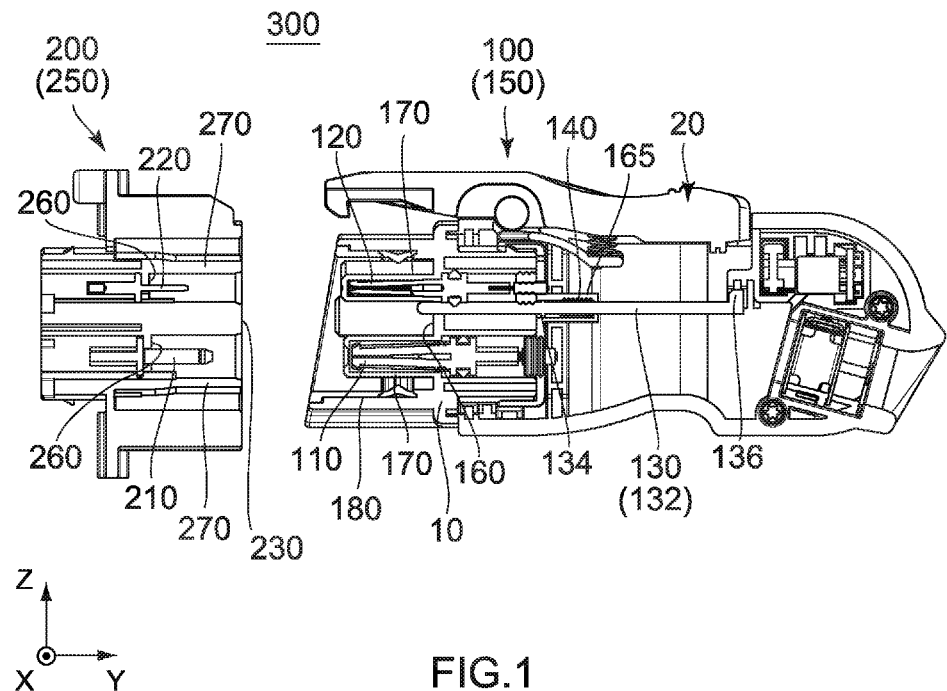
FIG. 1 is a partial cross-sectional view showing a connector assembly comprising a connector and a mating connector according to an embodiment of the present invention, wherein the connector is not mated with the mating connector, and a mated-state detection member is positioned at a projecting position.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 6:
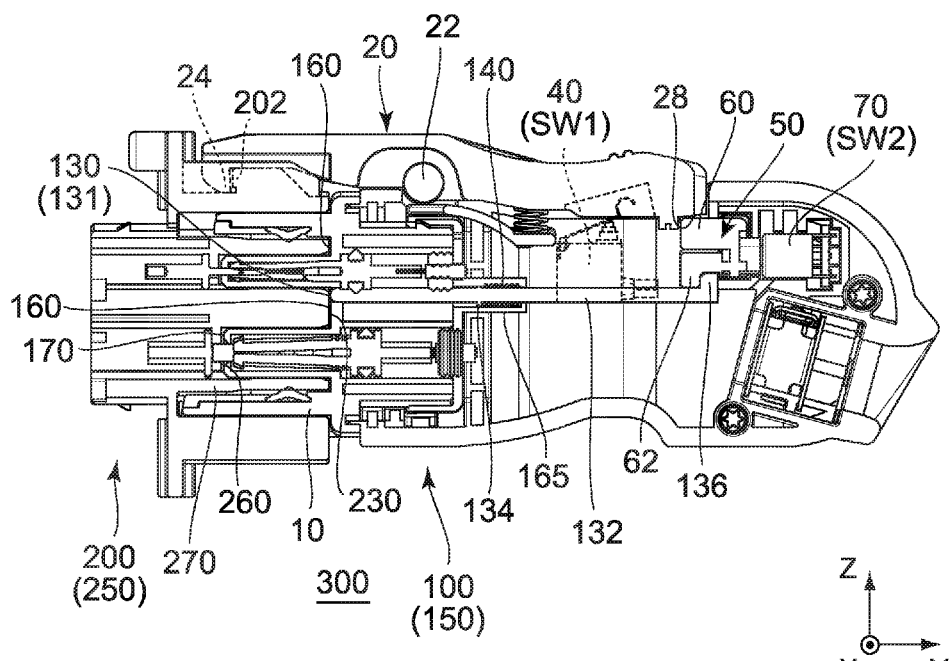
FIG. 6 is a partial cross-sectional view showing the connector assembly of FIG. 1, wherein the connector is mated with the mating connector, and the mated-state detection member is positioned at a receding position.

Referring to FIGS. 1, 2, 21 and 23, a connector assembly 300 according to an embodiment of the present invention comprises a connector (plug) 100 and a mating connector (inlet) 200 mateable with the connector 100 along a predetermined direction. The predetermined direction in the present embodiment is the Y-direction which is also referred to as "front-rear direction". For example, the mating connector 200 is a power receiving connector installed in an electric vehicle (not shown), and the connector 100 is a charging connector or a power supply connector which is connected with a cable (not shown) extending from an electric power supply system (not shown). Instead, the mating connector 200 may be a power supply connector installed in an electric vehicle, and the connector 100 may be a receiving connector which receives electric power from the electric vehicle. As shown in FIG. 6, the mating connector 200 is provided with a locked portion 202 and a mating push portion 230. Other portions of the mating connector 200 than the locked portion 202 and the mating push portion 230 will be explained later.

Figure 2:
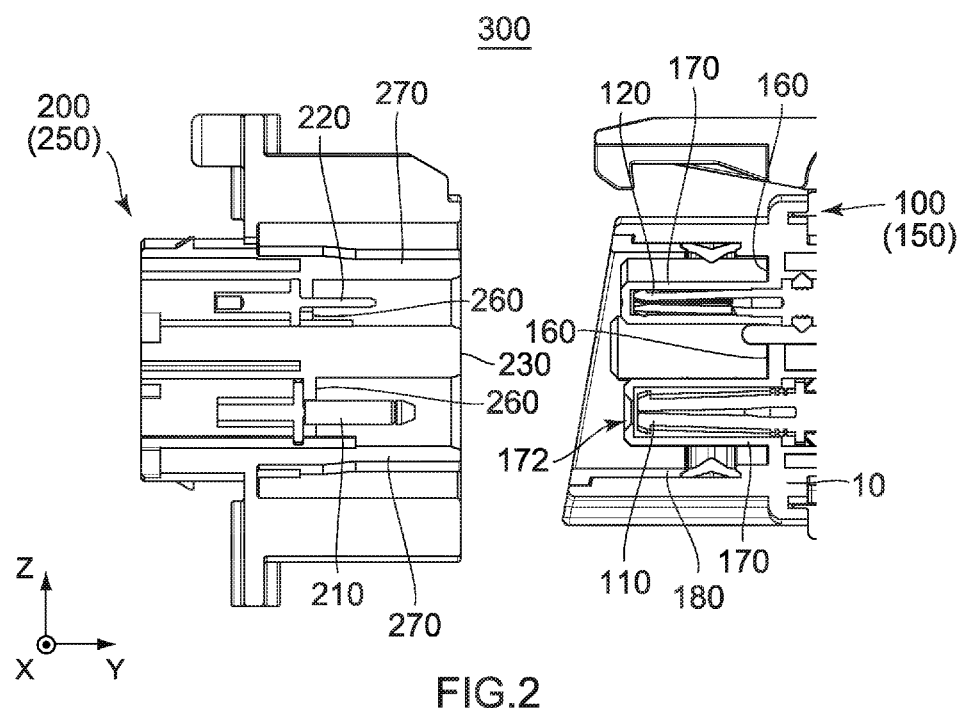
FIG. 2 is an enlarged view showing a part of the connector assembly of FIG. 1.
Figure 9:
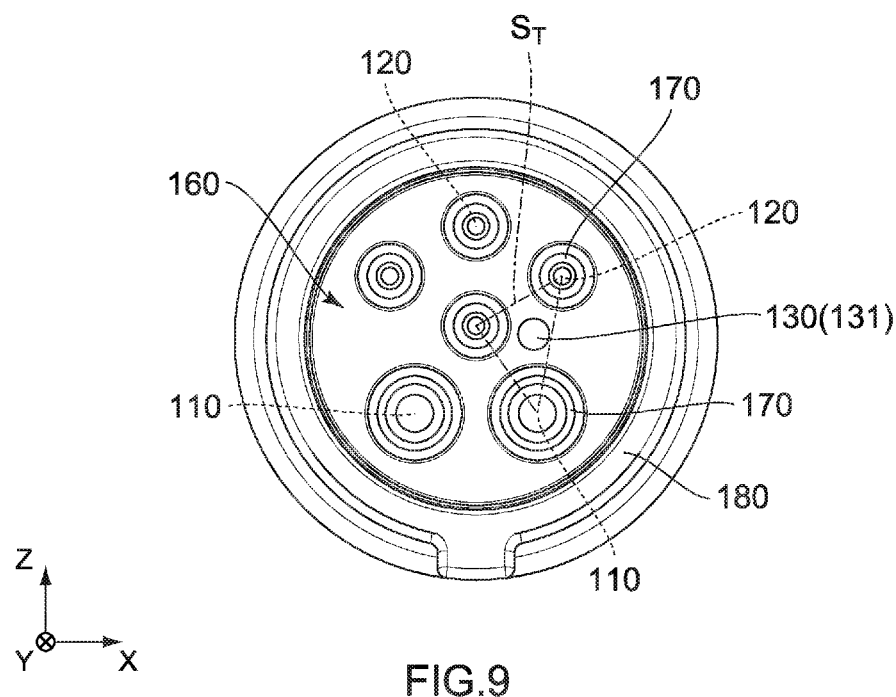
FIG. 9 is a front view showing an interface, or a fit portion, of the connector of FIG. 1.

As can be seen from FIGS. 1, 2 and 9, the connector 100 according to the present embodiment comprises two power terminals 110, four signal terminals 120, a mated-state detection member 130 and a holding mechanism 150.

Figure 15:
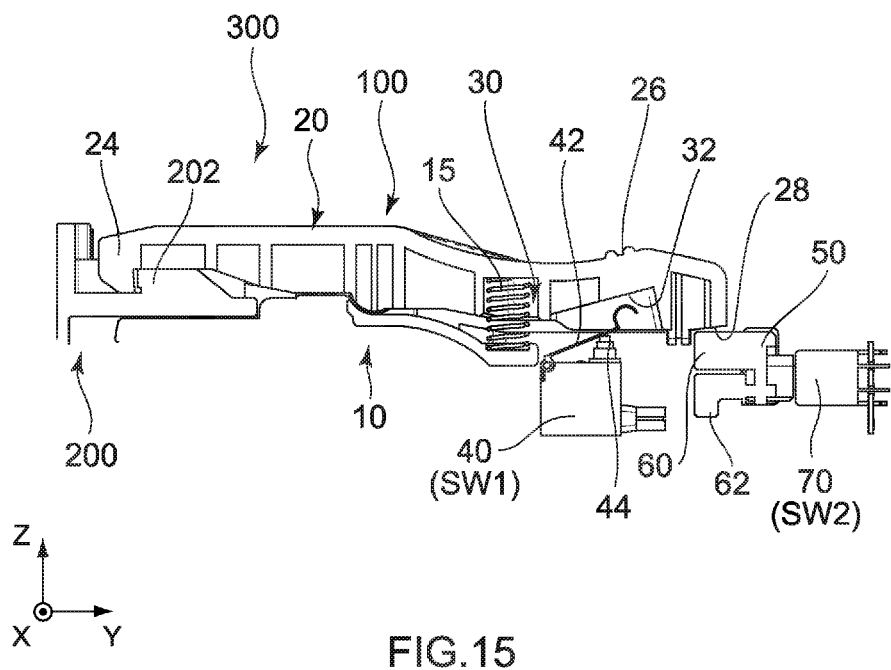
FIG. 15 is a view showing a lock member of the connector of FIG. 6 together with parts about the lock member, wherein the lock member is positioned at a lock position.
Figure 16:
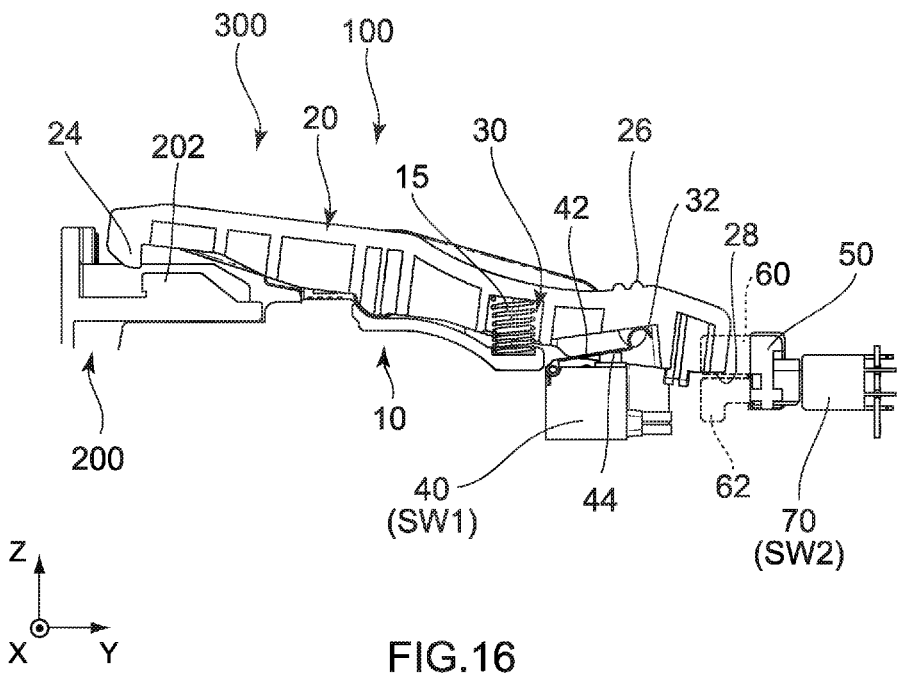
FIG. 16 is a view showing the lock member of the connector of FIG. 6 together with the parts about the lock member, wherein the lock member is positioned at an unlock position.

As can be seen from FIGS. 6, 15 and 16, the holding mechanism 150 comprises a housing 10 made of insulator, a bias member 15 formed of a coil spring, a lock member 20 formed of a lock lever, a position detection mechanism 40, a lock maintenance member 50 formed of a slider and a state detection mechanism 70.

As shown in FIGS. 1 and 2, the housing 10 has a reference surface 160, a flange accommodation portion 165, a plurality of insulating portions 170 and an insulating external wall 180. As can be seen from FIG. 9, the insulating portions 170 include two insulating portions 170 for the power terminals 110 and at least one insulating portion 170 for the signal terminal 120. In the present embodiment, the number of the insulating portions 170 for the signal terminals 120 is four. Thus, the number of the insulating portions 170 for the signal terminals 120 is equal to the number of the signal terminals 120. However, the present invention is not limited thereto. For example, all of the signal terminals 120 may be protected by only one of the insulating portions 170.

Figure 4:
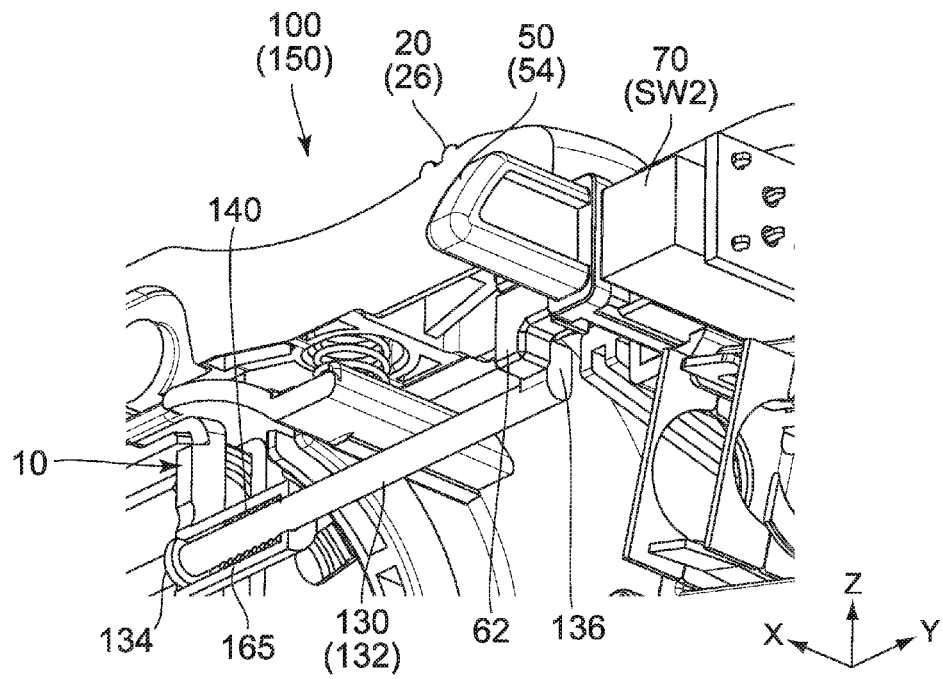
FIG. 4 is an enlarged view showing a part of the connector of FIG. 3.

As shown in FIG. 2, each of the insulating portions 170 projects from the reference surface 160 by a first predetermined length in the predetermined direction and has an end in the predetermined direction. In the present embodiment, "forward" means the negative Y-direction. Accordingly, a projecting direction, along which the insulating portion 170 projects from the reference surface 160, is a forward direction. The insulating external wall 180 projects forward beyond the reference surface 160 in the predetermined direction and surrounds the insulating portions 170 in a plane perpendicular to the predetermined direction. In the present embodiment, the plane perpendicular to the predetermined direction is the XZ-plane. The insulating external wall 180 of the present embodiment has a size larger than that of the insulating portions 170 in the predetermined direction. Moreover, all of the insulating portions 170 are located within a three-dimensional space surrounded by the insulating external wall 180. As can be seen from FIGS. 2 and 9, the reference surface 160 is a rear wall surface or a bottom of the three-dimensional space surrounded by the insulating external wall 180. As can be seen from FIG. 1, the flange accommodation portion 165 is positioned rearward of the reference surface 160 and is apart from the reference surface 160. As shown in FIG. 4, the flange accommodation portion 165 has a cylindrical structure which extends along the predetermined direction. The cylindrical structure of the flange accommodation portion 165 is partially formed with a planar surface, which is referred to as "key-surface".

As shown in FIGS. 1 and 2, each of the power terminals 110 is held by the housing 10 of the holding mechanism 150. Each of the power terminals 110 extends along the predetermined direction. Each of the power terminals 110 has a predetermined part which includes an end of the power terminal 110, and the predetermined parts of the power terminals 110 are accommodated in the insulating portions 170 for the power terminals 110, respectively. Similarly, each of the signal terminals 120 is held by the housing 10 of the holding mechanism 150. Each of the signal terminals 120 extends along the predetermined direction. Each of the signal terminals 120 has a predetermined part which includes an end of the signal terminal 120, and the predetermined part of each of the signal terminals 120 is accommodated in one of the insulating portions 170 for the signal terminals 120. As shown in FIG. 2, each of the insulating portions 170 has an opening 172 at the end thereof, and each of the power terminals 110 and the signal terminals 120 is contactable through the opening 172.

As can be seen from FIGS. 1 and 6, the mated-state detection member 130 is held by the housing 10 of the holding mechanism 150 and is movable between a projecting position and a receding position in the predetermined direction. The mated-state detection member 130 illustrated in FIGS. 1 to 4 is positioned at the projecting position. The mated-state detection member 130 illustrated in FIGS. 6 to 8 and 21 to 24 is positioned at the receding position.

Figure 5:
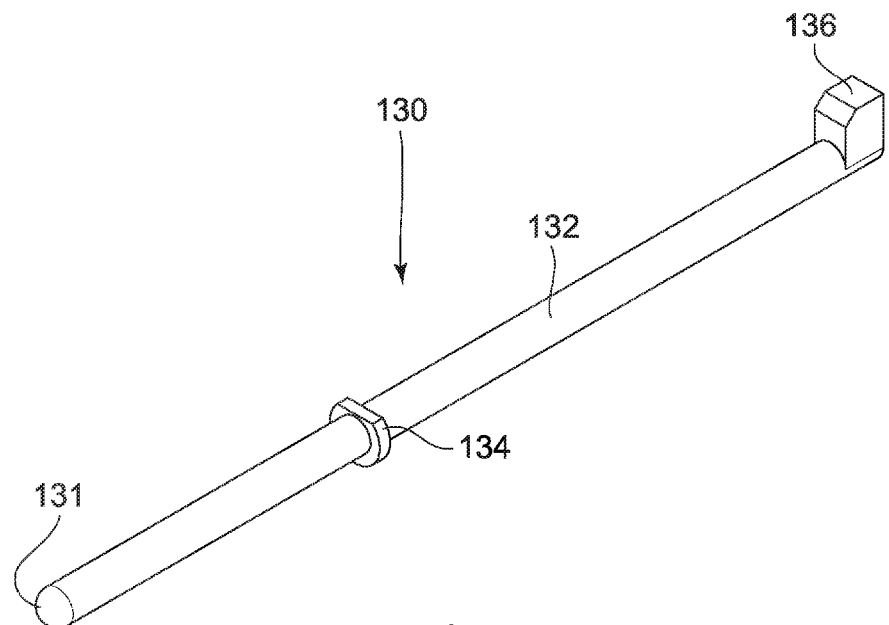
FIG. 5 is a perspective view showing the mated-state detection member of the connector of FIG. 3.

As shown in FIGS. 1, 5 and 6, the mated-state detection member 130 of the present embodiment has a rod 132 and a stopper 136. The rod 132 extends along the predetermined direction and is provided with a flange 134 which is formed around the rod 132 to have a D-like shaped cross-section. As shown in FIG. 4, the flange 134 is accommodated in the flange accommodation portion 165 of the housing 10 together with a spring 140 attached around the rod 132. The flange 134 is pushed forward by the spring 140, so that the mated-state detection member 130 under its initial state is positioned at the projecting position as shown in FIG. 1. The D-like shaped cross-section of the flange 134, together with the key-surface of the flange accommodation portion 165, prevents a rotation of the rod 132. As shown in FIGS. 1 and 6, the stopper 136 extends upward from the rod 132. In the present embodiment, "upward" means the positive Z-direction.

As shown in FIG. 2, in the present embodiment, a projecting length of the mated-state detection member 130 becomes longest when the mated-state detection member 130 is positioned at the projecting position. More specifically, the mated-state detection member 130 projects from the reference surface 160 by a second predetermined length when being positioned at the projecting position. In the present embodiment, the second predetermined length is shorter than the first predetermined length. Therefore, the mated-state detection member 130 does not project beyond the insulating portions 170 even when being positioned at the projecting position.

Figure 7:
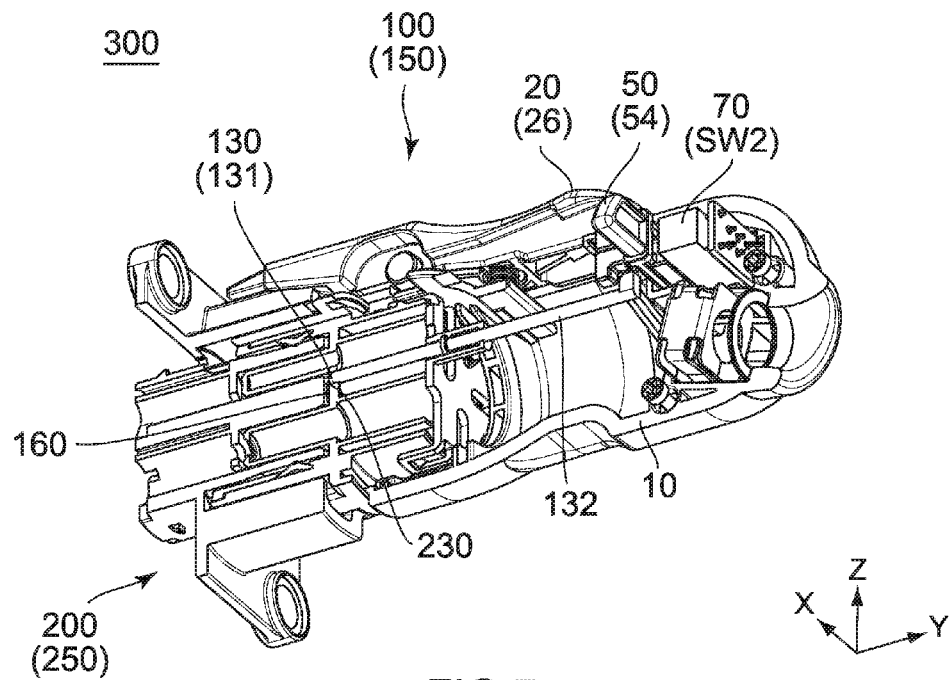
FIG. 7 is a partially cutaway, perspective view showing the connector assembly of FIG. 6, wherein the power terminals, the signal terminals, mating power terminals and mating signal terminals are not illustrated, and a lock maintenance member is under a permission state.

As shown in FIGS. 6 and 7, when the connector 100 is mated with the mating connector 200, the mated-state detection member 130 is pushed by the mating push portion 230 of the mating connector 200 and is moved to the receding position. According to the connector 100 of the present embodiment, the thus-positionable mated-state detection member 130 enables detection of a mated state of the connector 100 with the mating connector 200.

In the present embodiment, when the mated-state detection member 130 is positioned at the projecting position, the mated-state detection member 130 projects within the three-dimensional space which is surrounded by the insulating external wall 180 and in which the six insulating portions 170 extend in parallel to one another. Moreover, the second predetermined length is shorter than the first predetermined length. In other words, even when the mated-state detection member 130 is positioned at the projecting position, the projecting length of the mated-state detection member 130 is shorter than the length of the insulating portion 170. The thus-arranged insulating external wall 180 and insulating portions 170 prevent the mated-state detection member 130 from being unintentionally brought into contact with any members or portions, and therefore, are useful for prevention of incorrect detection of the mated state.

The mated-state detection member 130 has an end 131 in the predetermined direction. Hereafter, explanation will be made specifically about a first arrangement to a third arrangement each of which is a possible arrangement of the end 131 of the mated-state detection member 130.

(First Arrangement)

Figure 10:
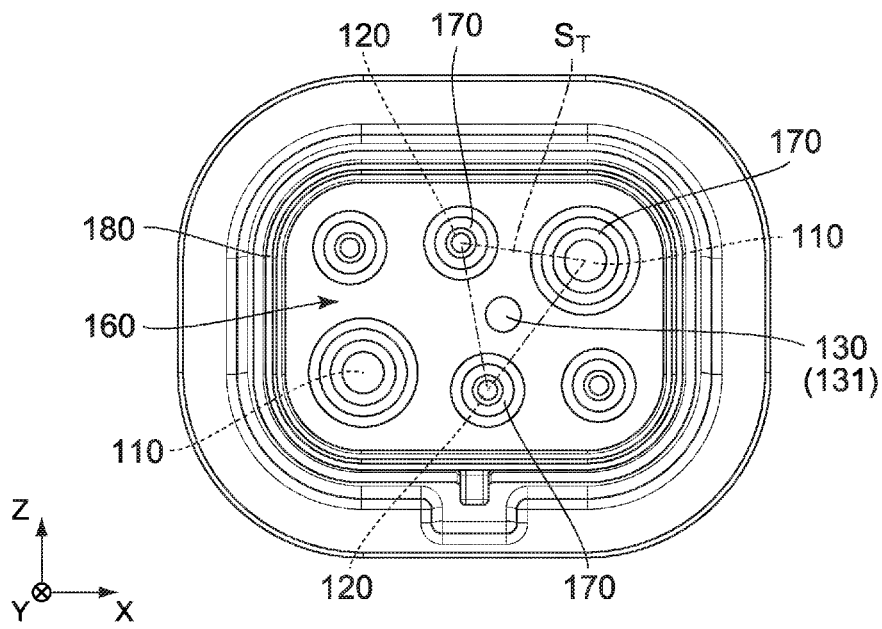
FIG. 10 is a front view showing a fit portion of a connector according to a modification.

Referring to FIGS. 1 and 2, the first arrangement can be adopted in a case where at least one signal terminal 120 is provided in addition to two of the insulating portions 170 for the power terminals 110, and the insulating portions 170 include at least one insulating portion 170 for the at least one signal terminal 120. In this case, since two of the power terminals 110 and two of the insulating portions 170 for the power terminals 110 are also provided, at least three of the insulating portions 170 are provided in total. Under the first arrangement as shown in FIG. 9, a middle point of the end 131 of the mated-state detection member 130 is positioned, in the plane perpendicular to the predetermined direction, or in the XZ-plane, inside of a triangle $S_T$ defined by three middle points of three of the insulating portions 170 which are adjacent to one another. This first arrangement is adopted to the connector 100 of the present embodiment. In a case where the first arrangement is adopted, the three insulating portions 170 prevent the mated-state detection member 130 from being unintentionally brought into contact with any members or portions, so that the end 131 of the mated-state detection member 130 is practically protected by the three insulating portions 170. In the first arrangement, the shape of a fit portion of the connector 100 is not limited to a circle-like shape as shown in FIG. 9 but may be a rectangular shape with rounded corners, for example, as shown in FIG. 10.

(Second Arrangement)

Figure 11:
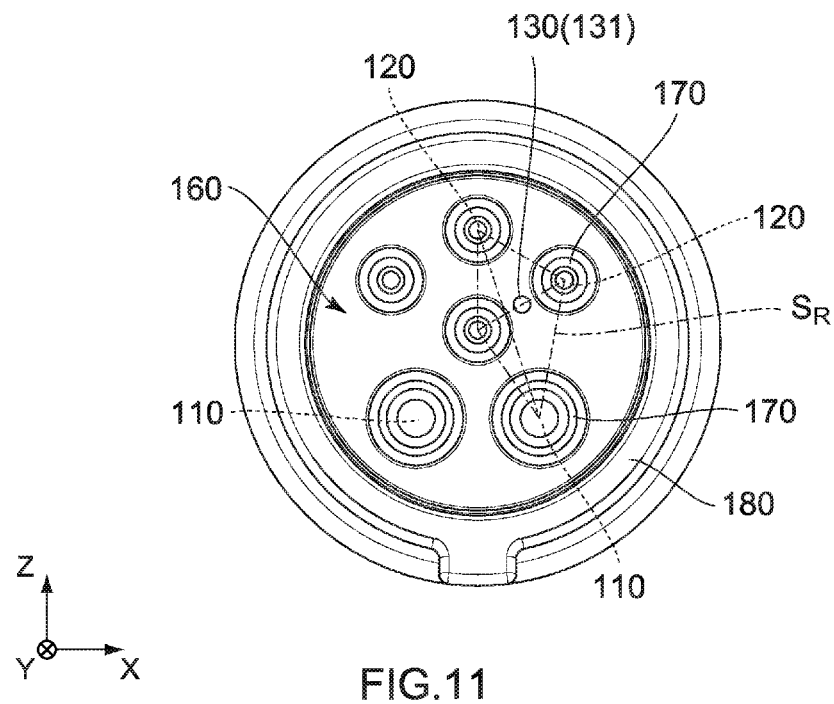
FIG. 11 is a front view showing a modification of the fit portion of FIG. 9.
Figure 12:
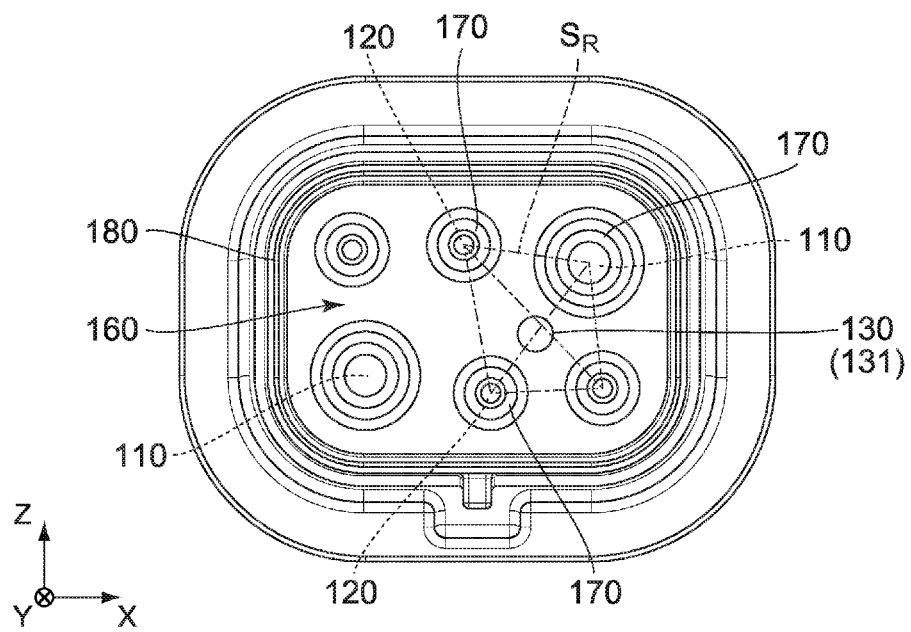
FIG. 12 is a front view showing a modification of the fit portion of FIG. 10.

Referring to FIGS. 1 and 2, the second arrangement can be adopted in a case where at least two signal terminals 120 are provided, and the insulating portions 170 include at least two insulating portions 170 for the at least two signal terminals 120. In this case, since two of the power terminals 110 and two of the insulating portions 170 for the power terminals 110 are also provided, at least four of the insulating portions 170 are provided in total. Under the second arrangement as shown in each of FIGS. 11 and 12, the middle point of the end 131 of the mated-state detection member 130 is positioned, in the plane perpendicular to the predetermined direction, on at least one of diagonal lines of a rectangle SR defined by four middle points of four of the insulating portions 170 which are adjacent to one another. The middle point of the end 131 of the mated-state detection member 130 may be positioned on the intersection point of the two diagonal lines. In a case where the second arrangement is adopted, the four insulating portions 170 prevent the mated-state detection member 130 from being unintentionally brought into contact with any members or portions, so that the end 131 of the mated-state detection member 130 is practically protected by the four insulating portions 170.

(Third Arrangement)

Figure 13:
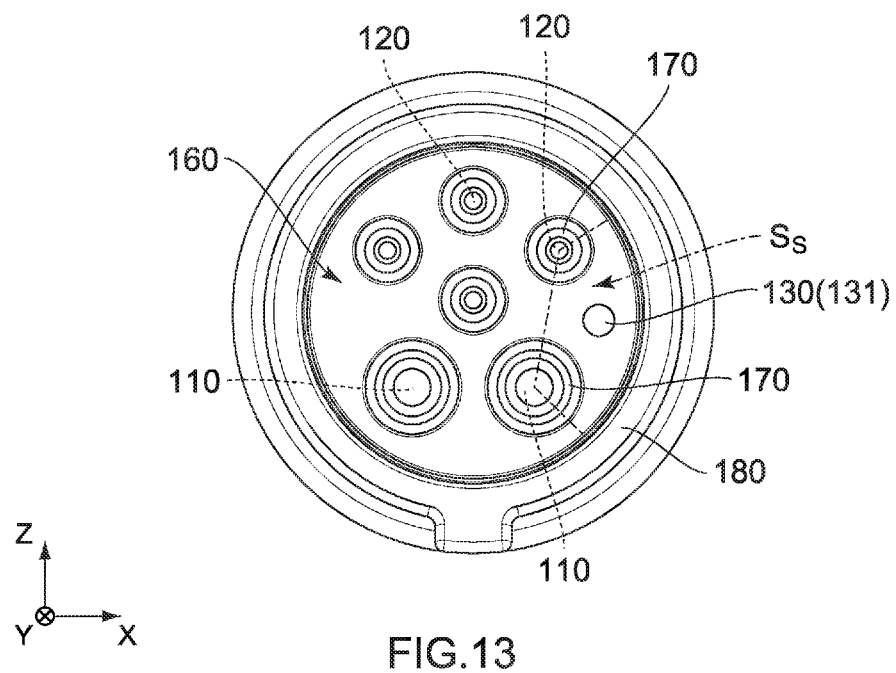
FIG. 13 is a front view showing another modification of the fit portion of FIG. 9.
Figure 14:
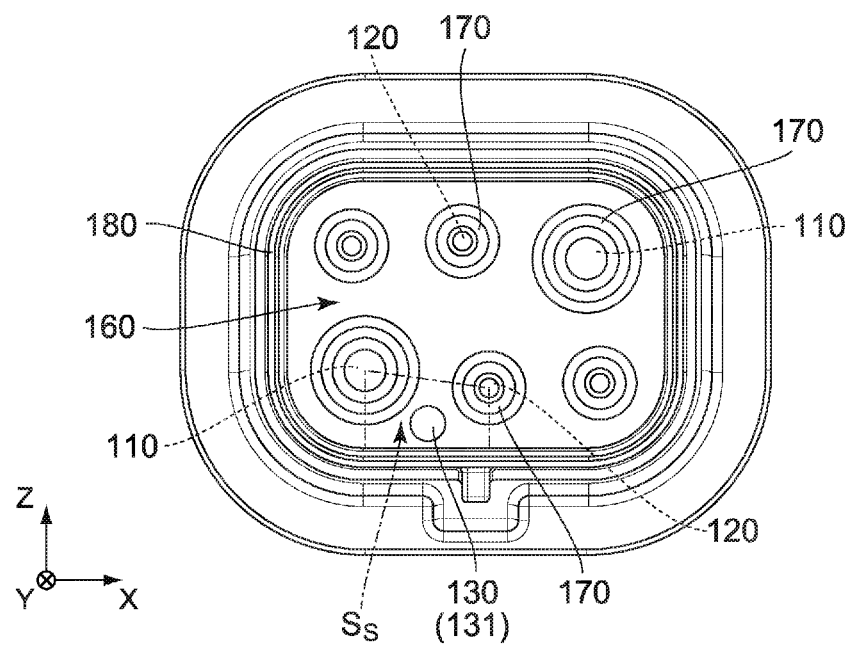
FIG. 14 is a front view showing another modification of the fit portion of FIG. 10.

Referring to FIGS. 1 and 2, the third arrangement can be adopted in a case where the insulating external wall 180 and two of the insulating portions 170 are provided. Under the third arrangement as shown in each of FIGS. 13 and 14, the insulating external wall 180 surrounds a two-dimensional section in the plane perpendicular to the predetermined direction. The insulating portions 170 include two outermost insulating portions 170 adjacent to each other and positioned outermost in the two-dimensional section. There is no other insulating portion 170 between each of the two outermost insulating portions 170 and a predetermined part of the insulating external wall 180 which is nearest to the outermost insulating portion 170. The two-dimensional section surrounded by the insulating external wall 180 can be divided into two divisional sections by dividing lines consisting of a straight line and two normal lines, wherein the straight line extends between middle points of the outermost insulating portions 170 in the two-dimensional section, the normal lines extend between the middle points of the outermost insulating portions 170 and corresponding points on the insulating external wall 180, respectively, and each of the normal lines is perpendicular to a tangent line to the corresponding point of the insulating external wall 180. If two or more normal lines can be drawn from one of the middle points of the outermost insulating portions 170 to the insulating external wall 180, the shortest one of these normal lines should be selected as the aforementioned normal line. According to the third arrangement shown in each of FIGS. 13 and 14, the middle point of the end 131 of the mated-state detection member 130 is positioned inside of a smaller divisional section Ss of the two divisional sections in the two-dimensional section. In a case where the third arrangement is adopted, the two outermost insulating portions 170 and the insulating external wall 180 prevent the mated-state detection member 130 from being unintentionally brought into contact with any members or portions, so that the end 131 of the mated-state detection member 130 is practically protected by the two outermost insulating portions 170 and the insulating external wall 180.

In addition, if the mating connector 200 has a structure as described below, the detection of the mated state can be more improved in accuracy. In detail, referring to FIGS. 1 and 2, the mating connector 200 comprises two mating power terminals 210, four mating signal terminals 220 and a mating holding mechanism 250. The mating power terminals 210 correspond to the power terminals 110, respectively, and the mating signal terminals 220 correspond to the signal terminals 120, respectively. As can be seen from FIGS. 1 and 6, when the connector 100 is mated with the mating connector 200, the power terminals 110 are connected to the mating power terminals 210, respectively, and the signal terminals 120 are connected to the mating signal terminals 220, respectively.

As best shown in FIG. 2, the mating holding mechanism 250 comprises a mating reference surface 260, the mating push portion 230 and mating insulating portions 270. The mating power terminals 210 and the mating signal terminals 220 are accommodated in the mating insulating portions 270, respectively. As can be seen from this structure, the mating insulating portions 270 correspond to the insulating portions 170, respectively. In the present embodiment, each of the mating insulating portions 270 encloses and protects the corresponding mating power terminal 210 or the corresponding mating signal terminal 220. As shown in FIG. 6, when the connector 100 is mated with the mating connector 200, the insulating portions 170 are received in the mating insulating portions 270, respectively. Each of the mating insulating portions 270 has a deepest end which forms a part of the mating reference surface 260. Therefore, when the connector 100 is mated with the mating connector 200, the end of each of the insulating portions 170 faces the mating reference surface 260.

As shown in FIG. 2, the mating push portion 230 is apart from the mating reference surface 260 by a third predetermined length in the predetermined direction. The third predetermined length is equal to or shorter than the first predetermined length. Therefore, the mating push portion 230 does not move the mated-state detection member 130 to the receding position unless the connector 100 is completely mated with the mating connector 200. As shown in FIG. 6, when the connector 100 is completely mated with the mating connector 200, the mating push portion 230 pushes the mated-state detection member 130 and moves the mated-state detection member 130 to the receding position. As can be seen from the mechanism described above, the connector assembly 300 comprising the connector 100 and the mating connector 200 has a structure which can detect whether the connector 100 is properly mated with the mating connector 200 or not.

As can be seen from FIGS. 3, 4 and 6 to 8, in the present embodiment, the result of the detection of the mated state by the mated-state detection member 130 is used to control a state of the lock maintenance member 50. Hereafter, explanation will be made in detail about the structure of the holding mechanism 150 and the state control of the lock maintenance member 50 in the present embodiment.

Figure 25:
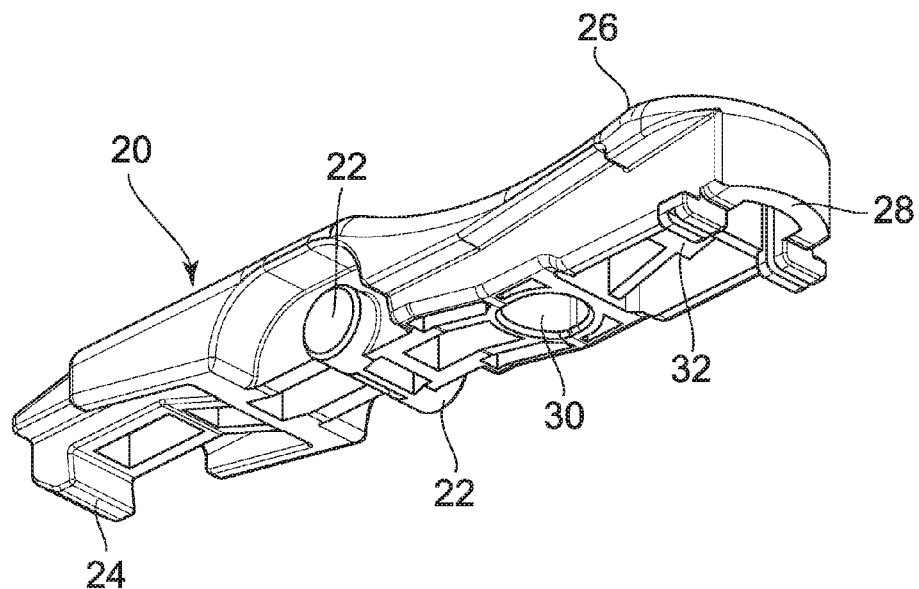
FIG. 25 is a perspective view showing the lock member of the connector of FIG. 6.

As shown in FIG. 25, the lock member 20 has a pivot 22, a lock portion 24, a first operation portion 26, a restricted portion 28, an accommodation portion 30 and a press portion 32. The pivot 22 is positioned between the lock portion 24 and the first operation portion 26. The restricted portion 28 is formed on an end of the lock member 20. The accommodation portion 30 and the press portion 32 are positioned between the pivot 22 and the first operation portion 26. In the present embodiment, the press portion 32 is positioned between the accommodation portion 30 and the restricted portion 28.

As apparent from FIG. 25, the lock member 20 according to the present embodiment is formed of a single member. In other words, the lock portion 24 and the first operation portion 26 are formed on a common member. Therefore, the lock portion 24 can be directly operated by operating the first operation portion 26.

As shown in FIGS. 1, 6, 15 and 16, the lock member 20 is supported by the housing 10. As can be seen from FIGS. 6 and 21, the pivot 22 extends in a lateral direction that is the X-direction in the present embodiment. As can be seen from FIGS. 15, 16 and 21, the lock portion 24 and the first operation portion 26 are movable in a seesaw manner with the pivot 22 as a center. In detail, the lock portion 24 is moved upward, or in the positive Z-direction, when the first operation portion 26 is moved downward, or in the negative Z-direction. Moreover, the lock portion 24 is moved downward when the first operation portion 26 is moved upward. As can be seen from FIGS. 22 and 24, the first operation portion 26, the restricted portion 28 and the press portion 32 are provided in the vicinity of the end of the lock member 20. In detail, the first operation portion 26 is positioned beyond the restricted portion 28 and the press portion 32 in the positive Z-direction, and the restricted portion 28 and the press portion 32 are positioned beyond the first operation portion 26 in the negative Z-direction. In other words, the first operation portion 26 is positioned above the restricted portion 28 and the press portion 32, and the restricted portion 28 and the press portion 32 are positioned below the first operation portion 26.

Figure 17:
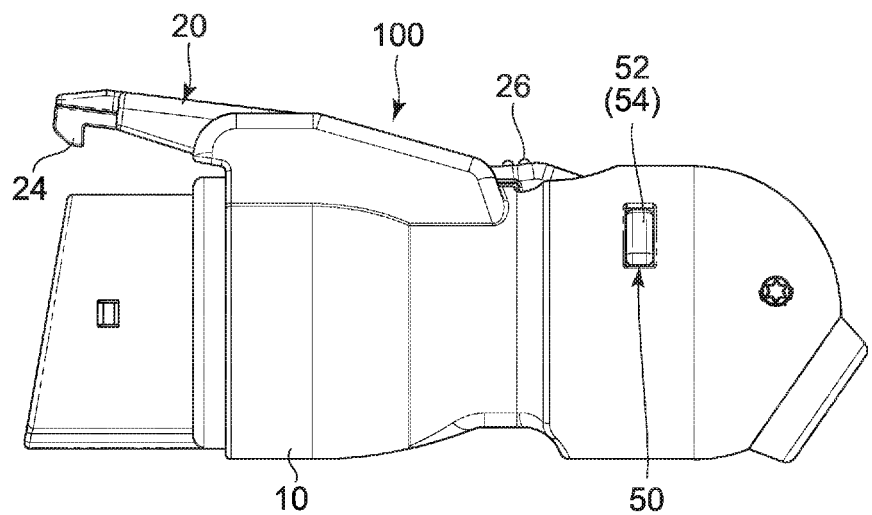
FIG. 17 is a side view showing the connector of FIG. 6, wherein the lock member is positioned at the unlock position.

As shown in FIGS. 15 and 16, the accommodation portion 30 of the lock member 20 accommodates a bias member (coil spring) 15. One of ends of the bias member 15 is fixed to the housing 10, and a remaining one of the ends of the bias member 15 is pressed against an inner wall of the accommodation portion 30. The thus-pressed bias member 15 constantly applies an upward spring force to the accommodation portion 30. As a result, when the first operation portion 26 is not operated, the lock portion 24 is positioned at a position shown in FIG. 15. The position of the lock member 20 shown in FIG. 15 is referred to as "lock position". As shown in FIGS. 16 and 17, when the first operation portion 26 is operated to be pressed in a first operation direction, the lock portion 24 is moved in a direction opposite to the first operation direction. A position of the lock member 20 shown in FIGS. 16 and 17 is referred to as "unlock position". The first operation direction in the present embodiment is a downward direction, or the negative Z-direction.

As described above, the lock member 20 is selectively positionable at the lock position or the unlock position. The lock member 20 is urged to be moved to the lock position by the bias member 15. When the first operation portion 26 is operated in the first operation direction, the lock member 20 is moved from the lock position to the unlock position. When the operation of the first operation portion 26 is stopped, the lock member 20 is returned back to the lock position by the bias member 15.

As can be seen from FIGS. 6 and 15, when the lock member 20 is positioned at the lock position, the lock portion 24 locks the locked portion 202 of the mating connector 200 to lock the mated state of the connector 100 with the mating connector 200. As can be seen from FIG. 16, when the lock member 20 is positioned at the unlock position, the lock of the lock portion 24 with the locked portion 202 of the mating connector 200 is released. Therefore, when the lock member 20 is positioned at the unlock position, the connector 100 is removable from the mating connector 200.

As can be seen from FIGS. 15 and 16, the position detection mechanism 40 is to detect whether the lock member 20 is positioned at the lock position or the unlock position.

Figure 29:
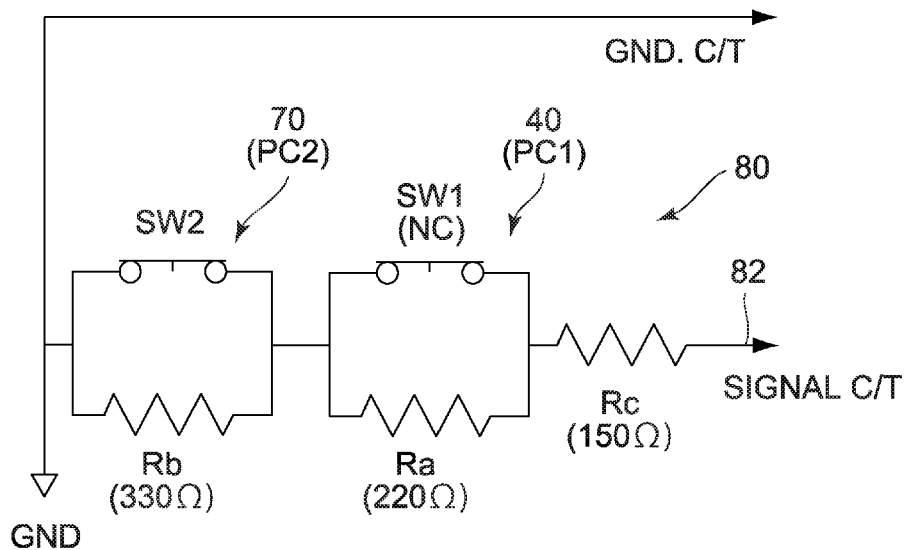
FIG. 29 is a circuit diagram showing a comprehensive detection mechanism which comprises the position detection mechanism and the state detection mechanism of the connector according to the embodiment of the present invention.

As can be seen from FIG. 29, the position detection mechanism 40 according to the present embodiment has a first parallel circuit PC1 in which a first switch SW1 and a first resistor Ra are connected in parallel. The first resistor Ra of the present embodiment has a resistance value of 220Ω. However, the first resistor Ra may have another resistance value. Moreover, another impedance element may be used instead of the first resistor Ra.

The first parallel circuit PC1 has a first variable impedance whose value is changed in response to a switching action of the first switch SW1. More specifically, the value of the first variable impedance is 0 Ω under a state where the first switch SW1 is closed while being 220Ω under another state where the first switch SW1 is opened.

Figure 26:
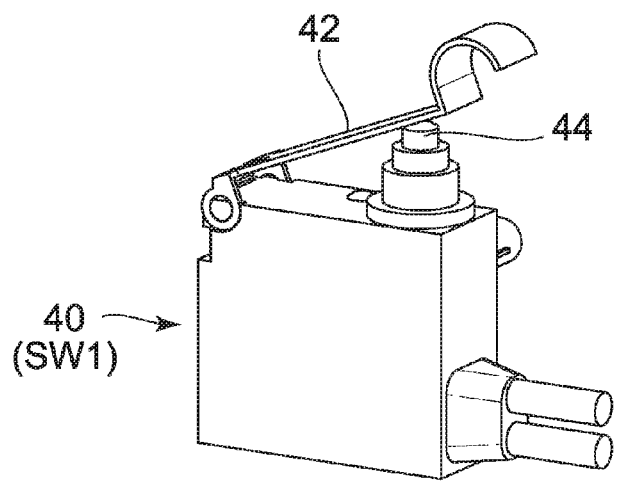
FIG. 26 is a perspective view showing a first switch of a position detection mechanism of the connector of FIG. 6.

As shown in FIG. 26, the first switch SW1 of the present embodiment is formed of a limit switch which has an arm 42 and a button 44, wherein the button 44 is pressed when an end of the arm 42 is pressed. The first switch SW1 is a normally closed switch. In other words, the first switch SW1 is closed under a normal state. The first switch SW1 is opened when the button 44 is pressed through the arm 42.

As can be seen from FIGS. 6, 15 and 16, the first switch SW1 is installed within the housing 10 and is positioned under the lock member 20. In detail, as shown in FIGS. 15 and 16, the end of the arm 42 is positioned under the press portion 32 of the lock member 20. As can be seen from FIG. 15, when the lock member 20 is positioned at the lock position, the arm 42 is not in contact with the press portion 32. Therefore, the first switch SW1 is closed. As can be seen from FIG. 16, when the lock member 20 is positioned at the unlock position, the arm 42 is pressed by the press portion 32, so that the button 44 is pressed. As a result, the first switch SW1 is opened. As described above, the switching state of the first switch SW1 is changed depending on whether the lock member 20 is positioned at the lock position or the unlock position. The arm 42 and the press portion 32 may be in contact with each other when the lock member 20 is positioned at the lock position, provided that the first switch SW1 is closed (i.e. provided that the button 44 is not pressed). However, in a view point of controlling the switching state of the first switch SW1 as intended in spite of variation in production quality and variation in assembly, the arm 42 and the press portion 32 are preferred not to be in contact with each other when the lock member 20 is positioned at the lock position.

Figure 27:
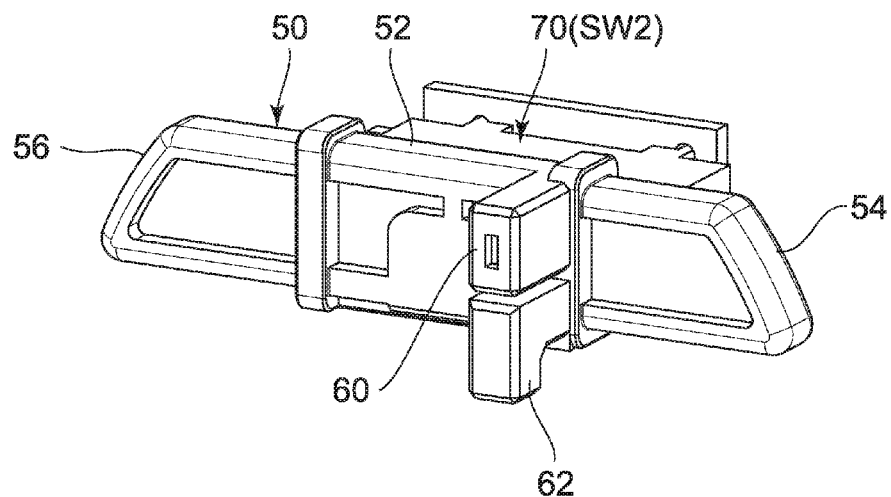
FIG. 27 is a perspective view showing the lock maintenance member and a second switch of a state detection mechanism of the connector of FIG. 6.

As shown in FIG. 27, the lock maintenance member 50 of the present embodiment is a member other than the lock member 20 and has a main portion 52, a restricting portion 60 and a stopped portion 62. Each of the restricting portion 60 and the stopped portion 62 projects from the main portion 52 in a direction perpendicular to the main portion 52. The main portion 52 has opposite ends which work as a second operation portion 54 and a third operation portion 56, respectively. Each of the second operation portion 54 and the third operation portion 56 has an end portion which extends obliquely. As described later, each of the second operation portion 54 and the third operation portion 56 has a shape matched with an outer shape of the housing 10 of the present embodiment. If the housing 10 has another shape different from that of the present embodiment, each of the second operation portion 54 and the third operation portion 56 may have another shape different from that of the present embodiment.

Figure 3:
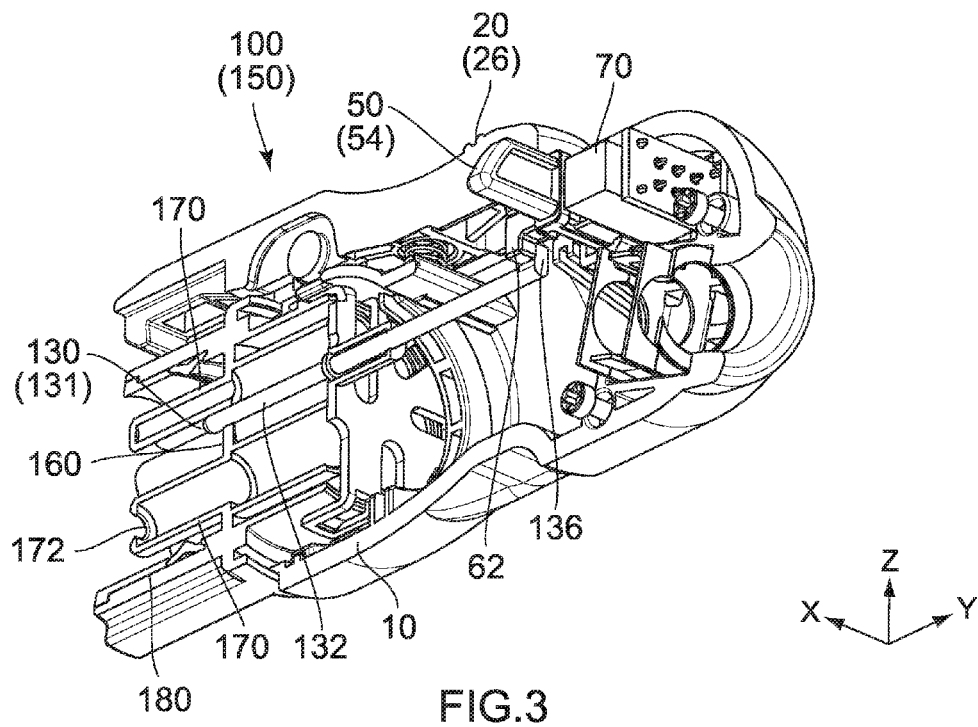
FIG. 3 is a partially cutaway, perspective view showing the connector of FIG. 1, wherein power terminals and signal terminals are not illustrated.
Figure 21:
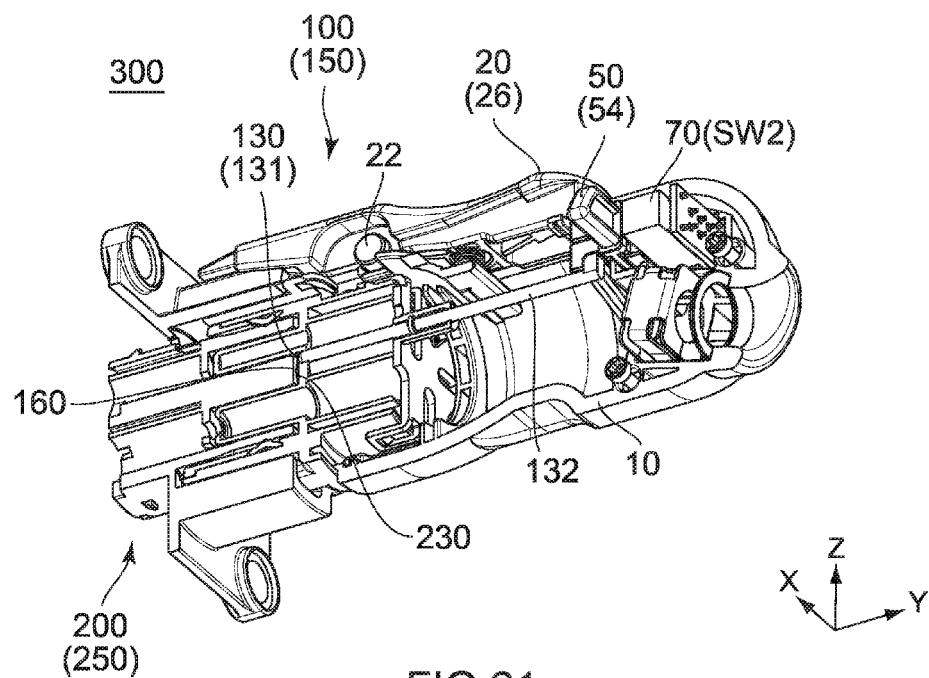
FIG. 21 is a partially cutaway, perspective view showing the connector assembly of FIG. 7, wherein the lock maintenance member is under a maintenance state.
Figure 22:
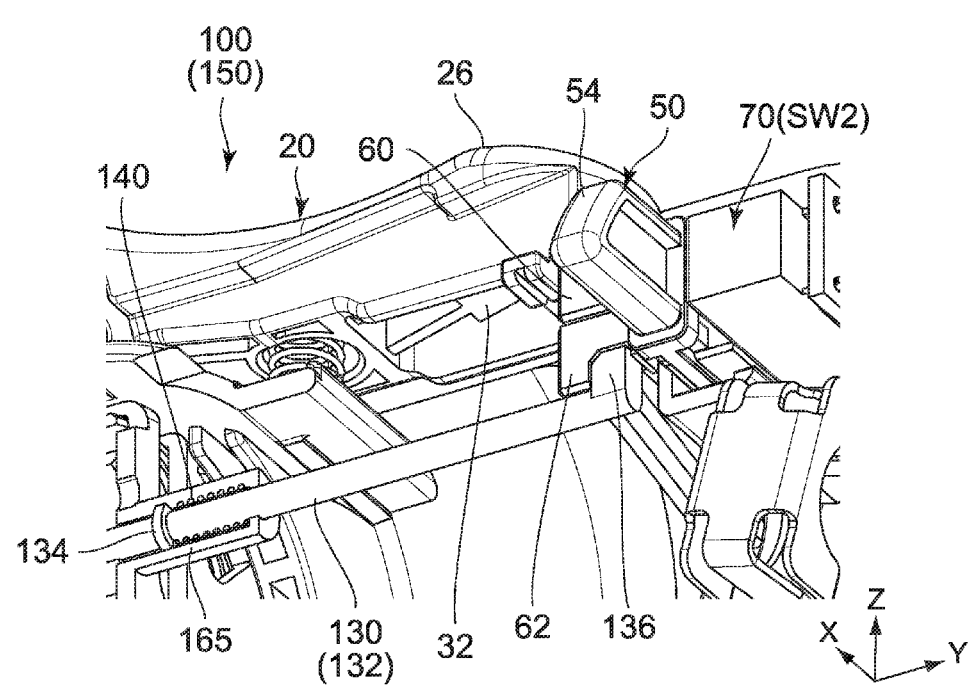
FIG. 22 is an enlarged view showing a part of the connector of FIG. 21.
Figure 23:
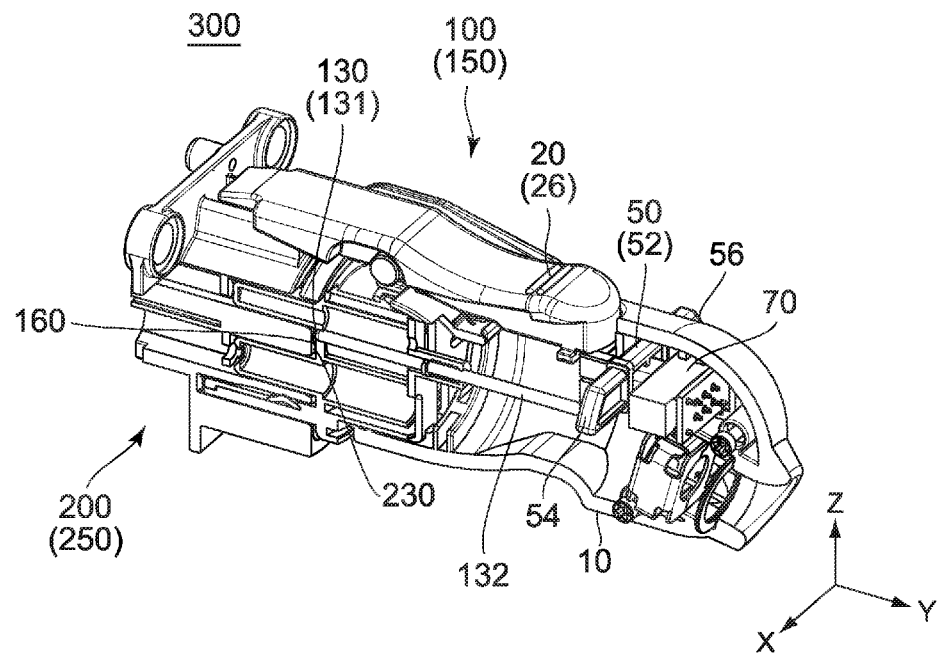
FIG. 23 is another partially cutaway, perspective view showing the connector assembly of FIG. 21.
Figure 24:
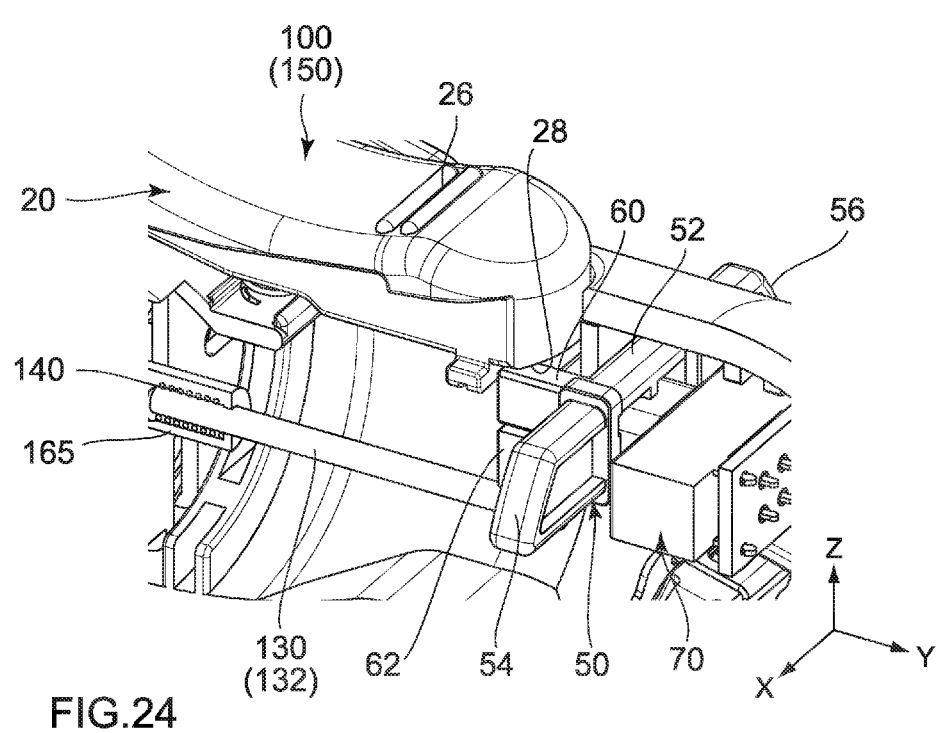
FIG. 24 is an enlarged view showing a part of the connector of FIG. 23.

As shown in FIGS. 3, 21 and 23, the lock maintenance member 50 is held by the housing 10. As can be seen from FIG. 23, the main portion 52 extends along the lateral direction so that the lock maintenance member 50 is slidable along the X-direction. The main portion 52 is positioned rearward of the lock member 20. As shown in FIG. 24, the restricting portion 60 projects forward from the main portion 52. As can be seen from FIGS. 22, 24 and 27, the stopped portion 62 is a projection which projects from the main portion 52 in the predetermined direction. The stopped portion 62 has an L-shaped cross-section and has an end which faces downward.

Figure 18:
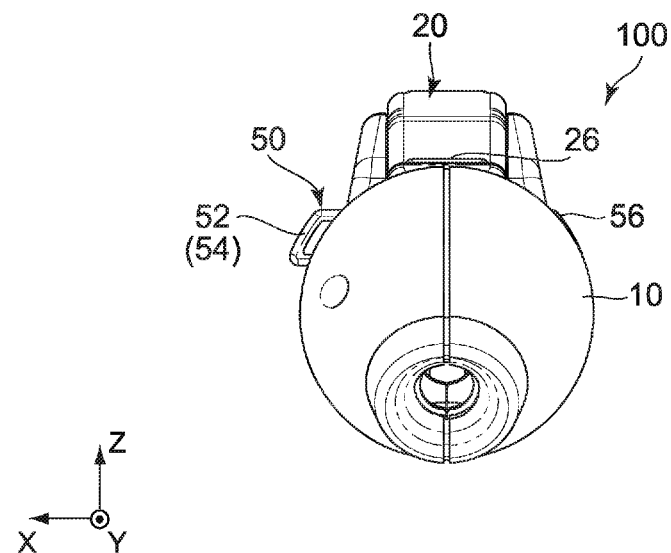
FIG. 18 is a rear view showing the connector of FIG. 17.
Figure 20:
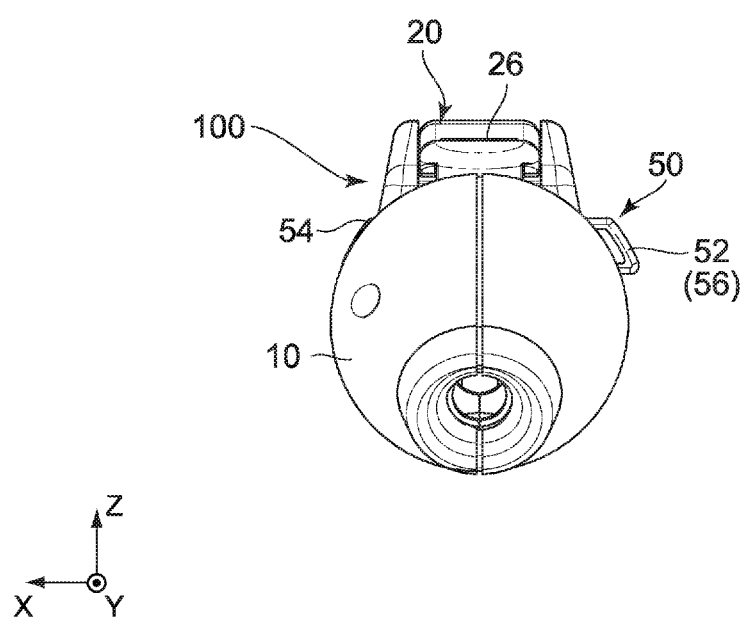
FIG. 20 is a rear view showing the connector of FIG. 19.

The lock maintenance member 50 is selectively takable one of two states, namely, a state where the second operation portion 54 greatly projects out from the housing 10 as shown in FIG. 18 and another state where the third operation portion 56 greatly projects out from the housing 10 as shown in FIG. 20. The former state of the lock maintenance member 50 is referred to as "maintenance state", and the latter state of the lock maintenance member 50 is referred to as "permission state". When the second operation portion 54 is operated to be pushed along a second operation direction, the third operation portion 56 greatly projects out from the housing 10, so that the lock maintenance member 50 changes its state from the permission state into the maintenance state. The second operation direction in the present embodiment is the negative X-direction. When the third operation portion 56 is operated to be pushed along a direction opposite to the second operation direction, or along the positive X-direction, the second operation portion 54 greatly projects out from the housing 10, so that the lock maintenance member 50 changes its state from the maintenance state into the permission state.

Figure 8:
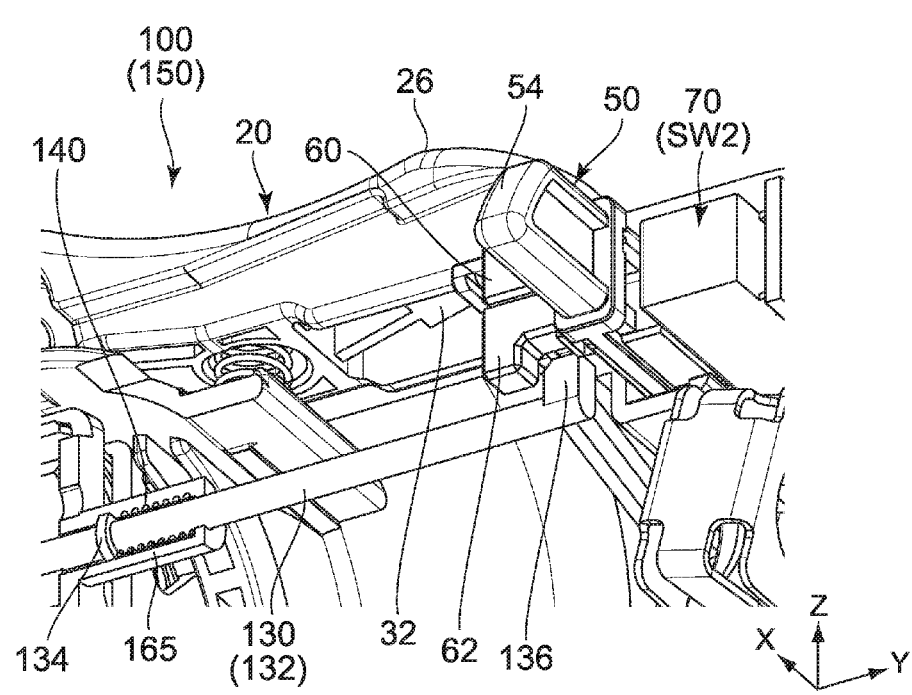
FIG. 8 is an enlarged view showing a part of the connector of FIG. 7.

As shown in FIGS. 3 and 4, when the mated-state detection member 130 is positioned at the projecting position, the stopper 136 faces, at least in part, the stopped portion 62 in the second operation direction to restrict the movement of the lock maintenance member 50 in the second operation direction. Therefore, when the mated-state detection member 130 is positioned at the projecting position, the state of the lock maintenance member 50 cannot be changed into the maintenance state. In other words, when the mated-state detection member 130 is positioned at the projecting position, the mated-state detection member 130 prevents the lock maintenance member 50 from taking the maintenance state. As shown in FIGS. 6 to 8, when the mated-state detection member 130 is positioned at the receding position, the stopper 136 is apart from the stopped portion 62 in the predetermined direction. Therefore, as can be seen from FIGS. 6 to 8 and 21 to 24, when the second operation portion 54 is operated in the second operation direction under a state where the mated-state detection member 130 is positioned at the receding position, the second operation portion 54 changes the state of the lock maintenance member 50 from the permission state into the maintenance state. In other words, when the mated-state detection member 130 of the present embodiment is positioned at the receding position, the mated-state detection member 130 permits the lock maintenance member 50 to take the maintenance state.

Referring to FIGS. 7, 8 and 16, when the lock member 20 is positioned at the lock position, there is an empty space under the restricted portion 28. Therefore, when the lock maintenance member 50 is made slide in the lateral direction so as to move the restricting portion 60 in the lateral direction, the restricting portion 60 is not brought into abutment with the lock member 20. Thus, when the lock member 20 is positioned at the lock position, the lock maintenance member 50 is selectively takable the maintenance state shown in FIG. 20 or the permission state shown in FIG. 18.

As shown in FIG. 24, when the lock maintenance member 50 is under the maintenance state, the restricting portion 60 is positioned under the restricted portion 28 of the lock member 20. Therefore, even if the operation of the first operation portion 26 of the lock member 20 urges the lock member 20 to be moved to the unlock position, the restricted portion 28 is brought into abutment with the restricting portion 60, so that the lock member 20 is unable to be moved to the unlock position. In other words, when the lock maintenance member 50 is under the maintenance state, the restricting portion 60 restricts the movement of the restricted portion 28 of the lock member 20 from the lock position toward the unlock position along the first operation direction. Therefore, as shown in FIG. 6, the mated state of the connector 100 with the mating connector 200 is locked.

Figure 19:
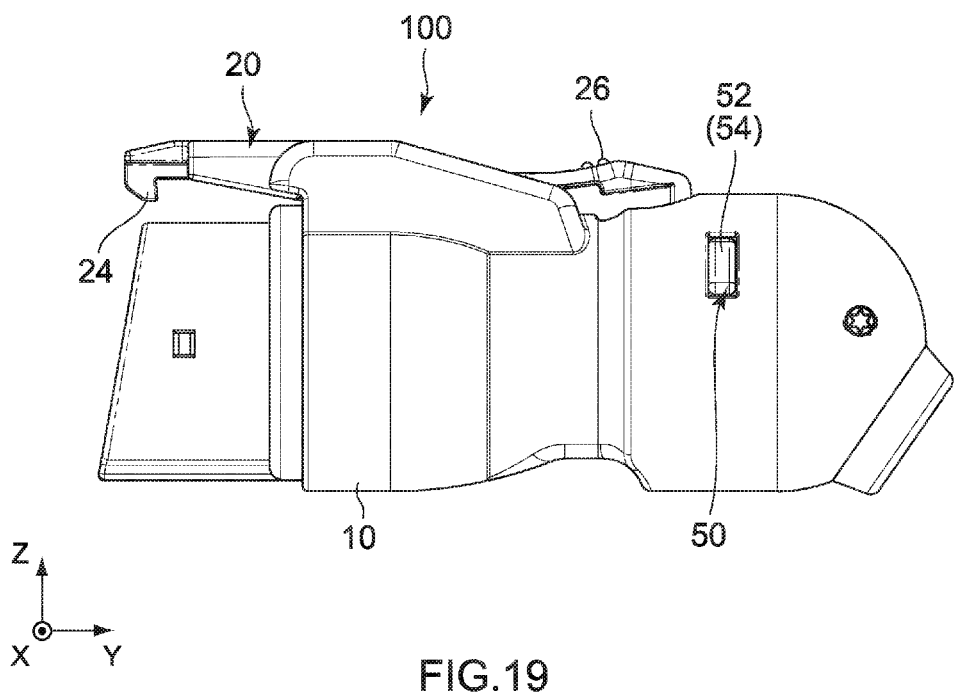
FIG. 19 is a side view showing the connector of FIG. 6, wherein the lock member is positioned at the lock position.

As shown in FIGS. 3 and 8, when the lock maintenance member 50 is under the permission state, the restricting portion 60 is not positioned under the restricted portion 28 of the lock member 20. Therefore, the restricting portion 60 does not restrict the movement of the restricted portion 28 of the lock member 20 along the first operation direction, so that the lock member 20 is freely positionable between the lock position shown in FIG. 19 and the unlock position shown in FIG. 17. In other words, when the lock maintenance member 50 is under the permission state, the lock maintenance member 50 permits the movement of the lock member 20 from the lock position toward the unlock position so that the lock member 20 is movable between the lock position and the unlock position with no restriction.

As shown in FIG. 8, when the lock member 20 is positioned at the unlock position, the restricting portion 60 is positioned toward the positive X-side of the lock member 20. Therefore, even if the lock maintenance member 50 is urged to slide in the negative X-direction, the restricting portion 60 is brought into abutment with the lock member 20 so that the lock maintenance member 50 is unable to be moved. Thus, when the lock member 20 is positioned at the unlock position, the lock maintenance member 50 is unable to change its state into the maintenance state.

As can be seen from FIG. 27, the state detection mechanism 70 is combined with the lock maintenance member 50. The state detection mechanism 70 is to detect whether the lock maintenance member 50 is under the maintenance state or the permission state.

As can be seen from FIG. 29, the state detection mechanism 70 according to the present embodiment has a second parallel circuit PC2 in which a second switch SW2 and a second resistor Rb are connected in parallel. The second resistor Rb of the present embodiment has a resistance value of 330Ω. The second resistor Rb may have another resistance value. Moreover, another impedance element may be used instead of the second resistor Rb. However, in a circuit structure according to the present embodiment, the second resistor Rb needs to have a resistance value different from that of the first resistor Ra so that a detection result of the state detection mechanism 70 can be distinguished from another detection result of the position detection mechanism 40.

The second parallel circuit PC2 has a second variable impedance whose value is changed in response to a switching action of the second switch SW2. More specifically, the value of the second variable impedance is 0 Ω under a state where the second switch SW2 is closed while being 330 Ω under another state where the second switch SW2 is opened.

Figure 28:
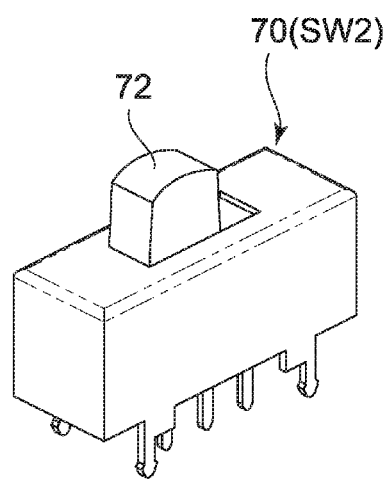
FIG. 28 is another perspective view showing the second switch of the state detection mechanism of FIG. 27.

As shown in FIG. 28, the second switch SW2 of the present embodiment is formed of a slide switch which has a tab 72. The switching state of the second switch SW2 is changed by sliding the tab 72.

As shown in FIGS. 4 and 6 to 8, the second switch SW2 is installed within the housing 10 and is positioned rearward of the lock maintenance member 50. In detail, referring to FIGS. 24, 27 and 28, the tab 72 of the second switch SW2 is held by the lock maintenance member 50 so that the sliding of the lock maintenance member 50 can open and close the second switch SW2. In detail, as can be seen from FIGS. 20 to 22, when the lock maintenance member 50 is under the maintenance state (i.e. when the third operation portion 56 greatly projects out from the housing 10), the second switch SW2 is closed. When the lock maintenance member 50 is under the permission state (i.e. when the second operation portion 54 greatly projects out from the housing 10), the second switch SW2 is opened.

As shown in FIG. 29, in the present embodiment, the position detection mechanism 40 and the state detection mechanism 70 are connected with each other to form a single comprehensive detection mechanism 80 which has a single output portion 82. The comprehensive detection mechanism 80 of the present embodiment has a circuit in which the first parallel circuit PC1, the second parallel circuit PC2 and a third resistor Rc are connected in series. The thus-formed comprehensive detection mechanism 80 has a combined variable impedance into which the first variable impedance, the second variable impedance and a resistance value (impedance) of the third resistor Rc are totaled.

Figure 30:
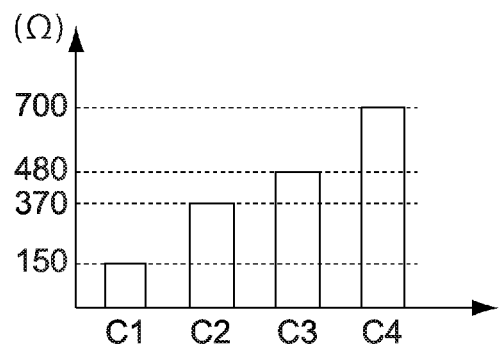
FIG. 30 is a graph showing detection results of the comprehensive detection mechanism of FIG. 29.

As can be seen from FIGS. 29 and 30, the combined variable impedance is changed among four values which correspond to four combinations of the two detection results of the position detection mechanism 40 and the two detection results of the state detection mechanism 70. The change of the combined variable impedance is reflected on a signal which is output from the output portion 82 of the comprehensive detection mechanism 80. More specifically, as described below, the signal that is output from the output portion 82 includes the detection result of the position detection mechanism 40 and the detection result of the state detection mechanism 70, which are combined with each other.

Referring to FIGS. 21, 22 and 29, the combination of the closed first switch SW1 and the closed second switch SW2 indicates that the lock member 20 is positioned at the lock position, and that the lock maintenance member 50 is under the maintenance state. The combination of the position of the lock member 20 and the state of the lock maintenance member 50 in this situation is referred to "combination C1". When this combination C1 is made under the mated state of the connector 100 with the mating connector 200, electric power can be transmitted and received.

Referring to FIGS. 16, 22 and 29, the combination of the opened first switch SW1 and the closed second switch SW2 indicates that the lock member 20 is positioned at the unlock position, and that the lock maintenance member 50 is under the maintenance state. The combination of the position of the lock member 20 and the state of the lock maintenance member 50 in this situation is referred to "combination C2". This combination C2 cannot be made under a state where each component of the connector 100 is properly moved. Therefore, when the combination C2 is made, it can be seen that there is a high possibility that the components are improperly engaged with each other.

Referring to FIGS. 8, 24 and 29, the combination of the closed first switch SW1 and the opened second switch SW2 indicates that the lock member 20 is positioned at the lock position, and that the lock maintenance member 50 is under the permission state. The combination of the position of the lock member 20 and the state of the lock maintenance member 50 in this situation is referred to "combination C3". When this combination C3 is made, the lock maintenance member 50 is under the permission state regardless of intentionally or unintentionally. For example, the lock maintenance member 50 might be misunderstood to take the maintenance state, and the restricting portion 60 might be unable to restrict the movement of the restricted portion 28 because of an incomplete operation of the second operation portion 54. In this case, the first operation portion 26 can be freely operated, therefore, there is a possibility that the lock is easily released so that the connector 100 comes off the mating connector 200.

Referring to FIGS. 3, 17 and 29, the combination of the opened first switch SW1 and the opened second switch SW2 indicates that the lock member 20 is positioned at the unlock position, and that the lock maintenance member 50 is under the permission state. The combination of the position of the lock member 20 and the state of the lock maintenance member 50 in this situation is referred to "combination C4". When this combination C4 is made, it can be seen that the first operation portion 26 of the lock member 20 is intended to be operated to unlock the lock.

As described above, in the present embodiment, the position of the lock member 20 and the state of the lock maintenance member 50 can be known in detail.

When the connector 100 according to the present embodiment is used in a system, for example, in a power supply system, the system can display one of the four detection results which indicates the combination of the detection result of the position detection mechanism 40 and the detection result of the state detection mechanism 70.

According to the connector 100 of the present embodiment, the lock maintenance member 50 which restricts the movement of the lock member 20 is manually operated. Therefore, in comparison with a connector comprising a solenoid, the connector 100 can be formed at low cost and can be miniaturized, and the state of the lock maintenance member 50 can be changed as intended.

In addition, the two detection mechanisms, namely, the position detection mechanism 40 and the state detection mechanism 70, are provided to help the operation. For example, when electric power cannot be supplied in spite of intention to supply the electric power, the reason why the electric power cannot be supplied can be identified as one of that the lock portion 24 does not lock the locked portion 202 or that the lock maintenance member 50 does not maintain the lock.

Moreover, under an unmated state where the connector 100 is not mated with the mating connector 200, the mated-state detection member 130 prevents the lock maintenance member 50 from taking the maintenance state. If the lock member 20 under the unmated state is positioned at the lock position and cannot be moved to the unlock position, the lock member 20 might be damaged upon mating of the connector 100 with the mating connector 200. According to the present embodiment, since the lock member 20 under the unmated state can be moved from the lock position to the unlock position, the aforementioned damage can be avoided.

While the present invention has been described with specific embodiments, the present invention is not limited to the aforementioned embodiments but can be variously modified and applied.

For example, the aforementioned lock member 20 is exposed outward of the housing 10. However, the most of the lock member 20 may be accommodated within the housing 10, provided that the first operation portion 26 is operable from the outside of the housing 10.

Although the aforementioned first switch SW1 is a normally closed switch, the first switch SW1 may be a normally open switch. Although the first switch SW1 is a limit switch, the first switch SW1 may be another type of switch. Similarly, although the second switch SW2 is a slide switch, the second switch SW2 may be another type of switch.

In the aforementioned embodiment, the position detection mechanism 40 is formed of the first parallel circuit PC1, and the state detection mechanism 70 is formed of the second parallel circuit PC2. However, the position detection mechanism 40 may be formed of a series circuit, and the state detection mechanism 70 may be formed of a series circuit.

Figure 31:
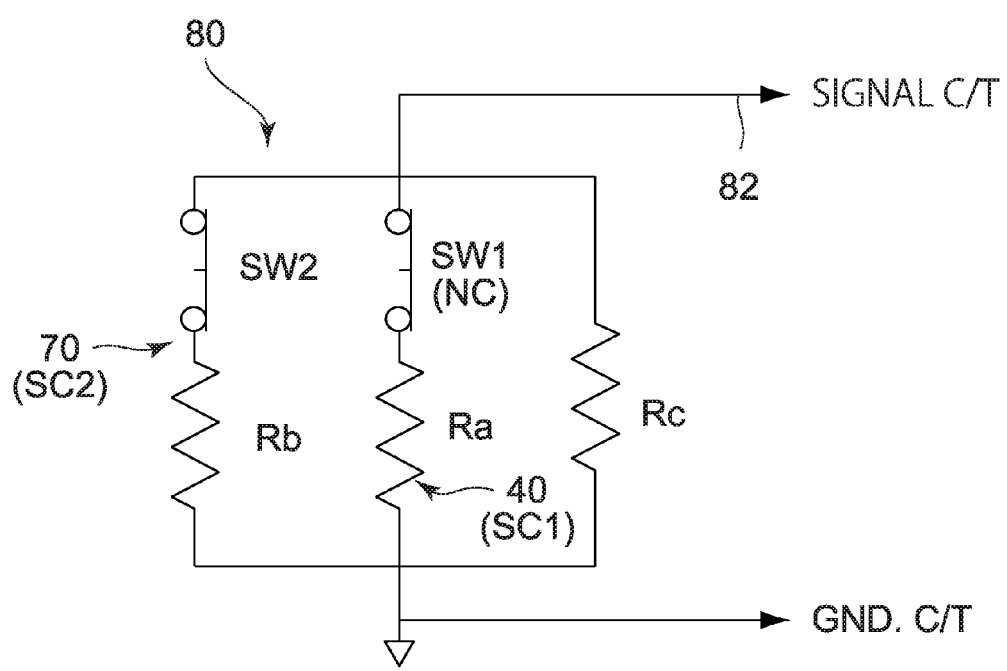
FIG. 31 is a circuit diagram showing a modification of the comprehensive detection mechanism of FIG. 29.
Figure 32:
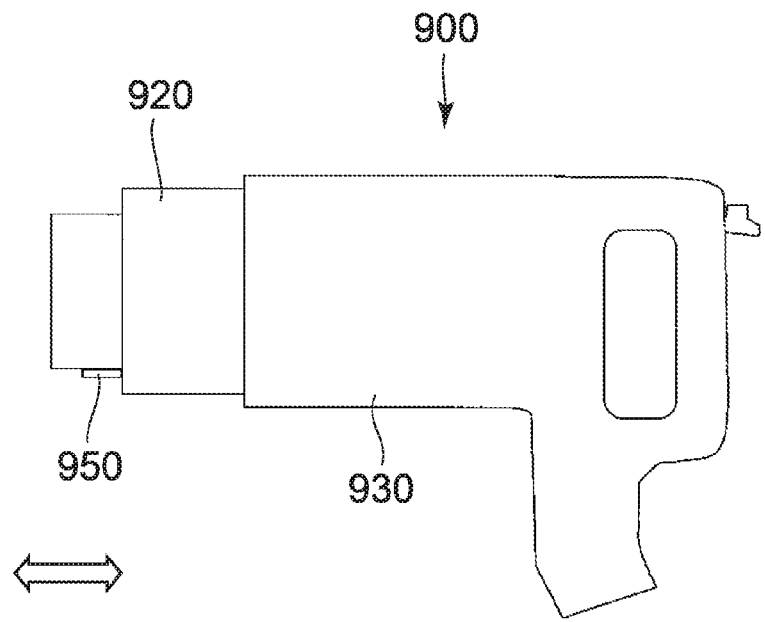
FIG. 32 is a side view showing the connector of Patent Document 1.
Figure 33:
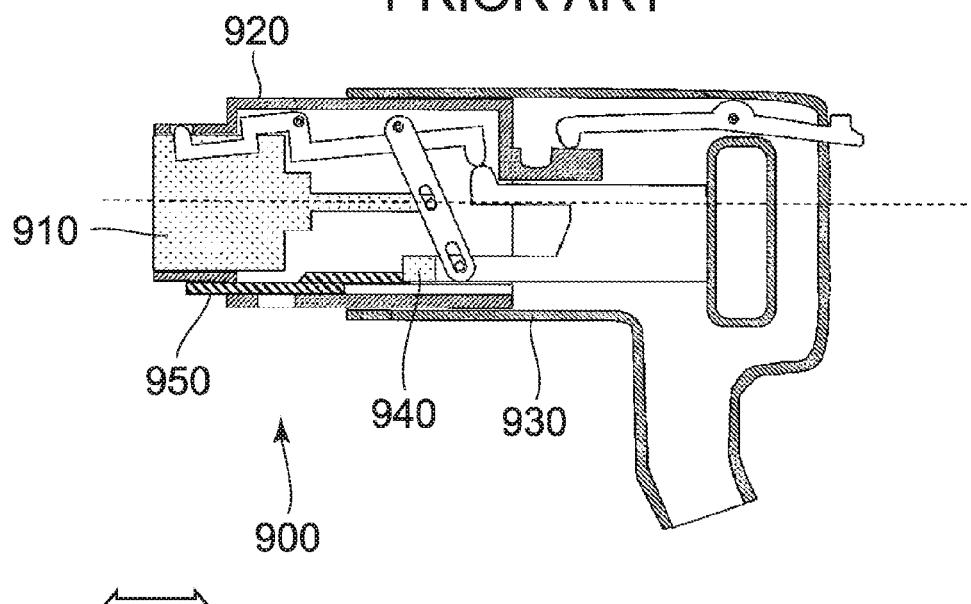
FIG. 33 is a cross-sectional view showing the connector of FIG. 32.

For example, as shown in FIG. 31, the position detection mechanism 40 may have a first series circuit SC1 in which the first switch SW1 and the first resistor Ra are connected in series, and the state detection mechanism 70 may have a second series circuit SC2 in which the second switch SW2 and the second resistor Rb are connected in series. In this case, the first series circuit SC1, the second series circuit SC2 and the third resistor Rc may be connected in parallel to form the comprehensive detection mechanism 80. Also in this case, the output portion 82 can output a signal which includes the detection result of the position detection mechanism 40 and the detection result of the state detection mechanism 70, which are combined with each other.

In the aforementioned embodiment, the connector 100 comprises the four signal terminals 120. However, the present invention is not limited thereto. The connector 100 may comprise any number of the signal terminals 120, provided that the connector 100 comprises at least one signal terminal 120 and at least three insulating portions 170 which correspond to the at least one signal terminal 120 and the two power terminals 110, respectively.

In the aforementioned embodiment, when the connector 100 is mated with the mating connector 200, the insulating portions 170 are received in the mating insulating portions 270, respectively. However, the present invention is not limited thereto. In contrast to the aforementioned embodiment, the structure of the connector 100 and the structure of the mating connector 200 may be modified so that the mating insulating portions 270 are received in the insulating portions 170, respectively.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector mateable with a mating connector along a predetermined direction, the connector comprising two power terminals, at least one signal terminal, a mated-state detection member and a holding mechanism, wherein:

the holding mechanism comprises a reference surface, a plurality of insulating portions and an insulating external wall;

the insulating portions include two insulating portions for the power terminals, and at least one insulating portion for the signal terminal;

each of the insulating portions projects from the reference surface by a first predetermined length in the predetermined direction;

the insulating external wall projects beyond the reference surface in the predetermined direction and surrounds the insulating portions in a plane perpendicular to the predetermined direction;

each of the power terminals is held by the holding mechanism and extends along the predetermined direction;

the power terminals have ends, respectively, and the ends of the power terminals are accommodated in the insulating portions for the power terminals, respectively;

the at least one signal terminal is held by the holding mechanism and extends along the predetermined direction;

the at least one signal terminal has an end which is accommodated in the at least one insulating portion for the signal terminal;

the mated-state detection member is held by the holding mechanism and is movable between a projecting position and a receding position in the predetermined direction;

when the mated-state detection member is positioned at the projecting position, the mated-state detection member projects from the reference surface by a second predetermined length which is shorter than the first predetermined length; and when the connector is mated with the mating connector, the mated-state detection member is pushed by the mating connector and is moved to the receding position.

2. The connector as recited in claim 1, wherein:
the mated-state detection member has an end in the predetermined direction; and
in the plane perpendicular to the predetermined direction, a middle point of the end of the mated-state detection member is positioned inside of a triangle defined by middle points of three of the insulating portions which are adjacent to one another.

3. The connector as recited in claim 1, wherein:
the at least one signal terminal is at least two signal terminals;
the insulating portions include at least two insulating portions for the signal terminals;
the mated-state detection member has an end in the predetermined direction; and
in the plane perpendicular to the predetermined direction, a middle point of the end of the mated-state detection member is positioned on at least one of diagonal lines of a rectangle defined by middle points of four of the insulating portions which are adjacent to one another.

4. The connector as recited in claim 1, wherein:
the mated-state detection member has an end in the predetermined direction;
the insulating external wall surrounds a section in the plane perpendicular to the predetermined direction;
the insulating portions include two outermost insulating portions adjacent to each other and positioned outermost in the section;

a middle point of the end of the mated-state detection member is positioned inside of a smaller divisional section of two divisional sections into which the section is divided by dividing lines consisting of a straight line and two normal lines;

the straight line extends between middle points of the outermost insulating portions in the section;

the normal lines extend between the middle points of the outermost insulating portions and corresponding points on the insulating external wall, respectively, and;

each of the normal lines is perpendicular to a tangent line to the corresponding point of the insulating external wall.

5. The connector as recited in claim 1, wherein:
the mating connector comprises a locked portion,
the holding mechanism comprises a lock member and a lock maintenance member other than the lock member;
the lock member has a lock portion and is selectively positionable at a lock position or an unlock position;
when the lock member is positioned at the lock position, the lock portion locks the locked portion to lock a mated state of the connector with the mating connector;
when the lock member is positioned at the unlock position, the connector is removable from the mating connector;
the lock maintenance member is selectively takable a maintenance state or a permission state;
when the lock maintenance member is under the maintenance state, the lock maintenance member restricts a movement of the lock member from the lock position toward the unlock position;
when the lock maintenance member is under the permission state, the lock maintenance member permits the movement of the lock member from the lock position toward the unlock position; and
when the mated-state detection member is positioned at the projecting position, the mated-state detection member prevents the lock maintenance member from taking the maintenance state; and
when the mated-state detection member is positioned at the receding position, the mated-state detection member permits the lock maintenance member to take the maintenance state.

6. The connector as recited in claim 5, wherein:
the lock member has a first operation portion;
when the first operation portion is operated in a first operation direction, the lock member is moved from the lock position to the unlock position;
the lock maintenance member has a second operation portion and a stopped portion;
the mated-state detection member has a stopper;
when the mated-state detection member is positioned at the projecting position, the stopper faces, at least in part, the stopped portion in a second operation direction to restrict a movement of the lock maintenance member in the second operation direction, wherein the second operation direction intersects with both the first operation direction and the predetermined direction;
when the mated-state detection member is positioned at the receding position, the stopper is apart from the stopped portion in the predetermined direction; and
when the second operation portion is operated in the second operation direction under a state where the mated-state detection member is positioned at the receding position, the second operation portion changes a state of the lock maintenance member from the permission state into the maintenance state.

7. The connector as recited in claim 6, wherein:
the connector further comprises a housing; and
the lock maintenance member is a slider held by the housing so as to be movable along the second operation direction.

8. The connector as recited in claim 7, wherein:
the lock member further comprises a pivot and a restricted portion;
the pivot is positioned between the lock portion and the first operation portion;
the lock member is supported by the housing so that the lock portion and the first operation portion are movable in a seesaw manner with the pivot as a center;
the lock maintenance member is provided with a restricting portion projecting in the predetermined direction;
when the lock maintenance member is under the permission state, the restricting portion does not restrict a movement of the restricted portion along the first operation direction; and
when the lock maintenance member is under the maintenance state, the restricting portion restricts the movement of the restricted portion along the first operation direction.

9. The connector as recited in claim 8, wherein:
the stopped portion is a projection which projects in the predetermined direction and has an L-shaped cross-section;
the mated-state detection member has a rod extending along the predetermined direction; and
the stopper extends from the rod in a perpendicular direction perpendicular to the predetermined direction.

10. The connector as recited in claim 5, wherein:
the holding mechanism further comprises a position detection mechanism and a state detection mechanism;
the position detection mechanism detects whether the lock member is positioned at the lock position or the unlock position; and
the state detection mechanism detects whether the lock maintenance member is under the maintenance state or the permission state.

11. A connector assembly comprising the connector as recited in claim 1 and a mating connector mateable with the connector along a predetermined direction, wherein:
the mating connector comprises two mating power terminals, at least one mating signal terminal and a mating holding mechanism;
the mating power terminals correspond to the power terminals, respectively;
the at least one mating signal terminal correspond to the at least one signal terminal;
the mating holding mechanism comprises a mating reference surface and a mating push portion;
the insulating portions have ends, respectively, in the predetermined direction;
when the connector is mated with the mating connector, the ends of the insulating portions face the mating reference surface;
the mating push portion is apart from the mating reference surface by a third predetermined length in the predetermined direction;
the third predetermined length is equal to or shorter than the first predetermined length; and
when the connector is mated with the mating connector, the mating push portion pushes the mated-state detection member and moves the mated-state detection member to the receding position.

\* \* \* \* \*